(12) United States Patent
Ikegawa

(10) Patent No.: US 6,538,758 B1
(45) Date of Patent: Mar. 25, 2003

(54) IMAGE OUTPUT APPARATUS AND METHOD THEREOF, AND IMAGE OUTPUT SYSTEM

(75) Inventor: Yoshiharu Ikegawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/309,495

(22) Filed: May 11, 1999

(30) Foreign Application Priority Data

May 15, 1998 (JP) .......................................... 10-133984
May 15, 1998 (JP) .......................................... 10-133985

(51) Int. Cl.[7] ............................................. G06K 15/00
(52) U.S. Cl. ..................................................... 358/1.13
(58) Field of Search ................................. 358/1.1, 1.12, 358/1.13, 1.14, 1.15, 304, 498; 399/6, 16, 361, 382, 383; 270/1.01; 400/578, 582, 586, 607, 611

(56) References Cited

U.S. PATENT DOCUMENTS 6,351,318 B1 * 2/2002 Gunning et al. ............. 358/1.1
6,411,784 B1 * 6/2002 Taniguchi ................... 382/119

* cited by examiner

Primary Examiner—Arthur G. Evans
(74) Attorney, Agent, or Firm—Fitzpatrick, Cella, Harper & Scinto

(57) ABSTRACT

In an image output apparatus which performs printing based on transferred data, when bus reset occurs during isochronous data transfer through a serial bus, the data transfer is suspended and a print error is caused. Therefore, when bus reset occurs during image data transfer through the serial bus, transferring and outputting of image data is performed again, and stapling is performed for proper stapling. Similarly, when bus reset occurs, transferring and outputting of image data is suspended, the printouts whose printing has been suspended are discharged to a dedicated bin provided for erroneous printouts, and transferring and outputting of the image data is performed again. Accordingly, an erroneous printout caused by bus reset is not intermingled with proper printouts on the same bin.

52 Claims, 16 Drawing Sheets

BRANCH : NODE WITH TWO OR MORE NODE CONNECTIONS

LEAF : NODE WITH SINGLE PORT CONNECTION

□ : PORT
c : PORT CORRESPONDING TO CHILD NODE
p : PORT CORRESPONDING TO PARENT NODE

IMAGE OUTPUT APPARATUS AND METHOD THEREOF, AND IMAGE OUTPUT SYSTEM

BACKGROUND OF THE INVENTION

The present invention relates to an image output apparatus and method thereof, and an image output system. More specifically, the present invention relates to an image output apparatus connected to another device by a serial bus, and an image output method of the apparatus and an image output system.

Conventionally, so-called direct printing is realized in a system comprising a personal computer (PC), a printer, other peripheral devices, a record-reproduction apparatus such as a digital camera or a digital video tape recorder (VTR) or the like, a scanner and so forth, which are connected in the network structure by using a general-type digital interface (I/F). In the direct printing, since each device directly sends an output command to the printer, data transfer between each of the devices in the network is possible without necessitating PC mediation. Therefore, bus transfer efficiency can be improved.

Furthermore, direct printing is also characterized in that, in a case where an interface (hereinafter referred to as "1394 serial bus") defined by the IEEE 1394 standard is employed as the aforementioned digital interface (I/F), a predetermined transfer speed can be ensured by isochronous data transfer. By performing printing operation in synchronization with the isochronous data transfer, the printer does not need to secure a memory capacity for one page of image. Therefore, cost reduction can be achieved in the printer.

However, since the aforementioned 1394 serial bus has Plug and Play function, if a device is newly connected or disconnected, bus reset occurs and data transfer is suspended. Therefore, such printer which is connected to the 1394 serial bus and does not have a memory capacity for one page of image, has the following problems.

More specifically, if bus reset occurs during printout operation while performing isochronous data transfer, the data transfer is suspended and an erroneous image is generated, resulting in an erroneous printout.

Furthermore, in a case where printed paper is stapled by the printer, a problem occurs in that the erroneous printout is included in the stapled paper.

Still further, if an erroneous printout is outputted together with the normal printouts, the user has to perform cumbersome operation of selecting and removing the erroneous printout.

SUMMARY OF THE INVENTION

The present invention is made in consideration of the above situation, and has as its object to provide an image output apparatus and method thereof, and an image output system, for always stapling properly printed paper even in a case where bus reset occurs during image data transfer in the image output apparatus which is connected to the 1394 serial bus and has staple function.

According to the present invention, the foregoing object is attained by providing an image output apparatus connected to another device by a serial bus, comprising: communication means for performing communication with the another device through the serial bus and receiving image data transferred by the another device; image formation control means for controlling to form an image on a print medium based on the image data received by the communication means; staple control means for controlling to staple a plurality of print media on which image forming is performed; and detection means for detecting an initialized state of the serial bus during image data reception by the communication means, wherein in a case where the detection means detects the initialized state of the serial bus, the communication means requests the another device to transfer the image data and receives the image data again, then the image formation control means controls to form an image on a print medium based on the received image data, and the staple control means controls to staple print media on which image forming is performed.

By virtue of the above configuration, it is possible to prevent intermingling of erroneous printouts with stapled paper.

It is another object of the present invention to provide an image output apparatus and method thereof, and an image output system, for outputting printed paper such that properly printed paper is not intermingled with erroneously printed paper, even in a case where bus reset occurs during image data transfer in the image output apparatus which is connected to the 1394 serial bus.

According to the present invention, the foregoing object is attained by providing an image processing apparatus comprising an image output apparatus connected to another device by a serial bus, comprising: communication means for performing communication with the another device through the serial bus and receiving image data transferred by the another device; image formation control means for controlling to form an image on a print medium based on the image data received by the communication means; discharge control means for controlling to discharge the print medium on which image forming is performed; and detection means for detecting an initialized state of the serial bus during image data reception by the communication means, wherein the discharge control means controls to discharge print medium, on which image forming is performed when the detection means detects the initialized state of the serial bus, so as not to be intermingled with another print medium on which image forming is performed.

By virtue of the above configuration, it is not necessary for a user to perform cumbersome operation of selecting and removing erroneously printed paper.

The invention is particularly advantageous because proper printouts can always be obtained by the image output apparatus connected to the 1394 serial bus, by instructing to re-transfer image data when bus reset occurs during image data transfer and by controlling output of erroneous printouts.

Accordingly, only the properly printed paper is always stapled.

Furthermore, printed paper can be outputted such that properly printed paper is not intermingled with erroneously printed paper.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

The present embodiment employs an interface (hereinafter referred to as "1394 serial bus"), defined by the IEEE 1394 standard, as a digital I/F connecting respective devices. Hereinafter, the outline of the 1394 serial bus is described.

Outline of 1394 Serial Bus

With the appearance of home-use digital video tape recorder (VTR) and digital video disk (DVD) player, there is a need for transferring, in realtime, a large amount of data such as video data and audio data (hereinafter referred to as "AV data"). To transfer AV data in realtime to a personal computer (PC) or other digital devices, an interface capable of high-speed data transfer is required. The 1394 serial bus has been developed in view of the above purpose.

Figure 6:
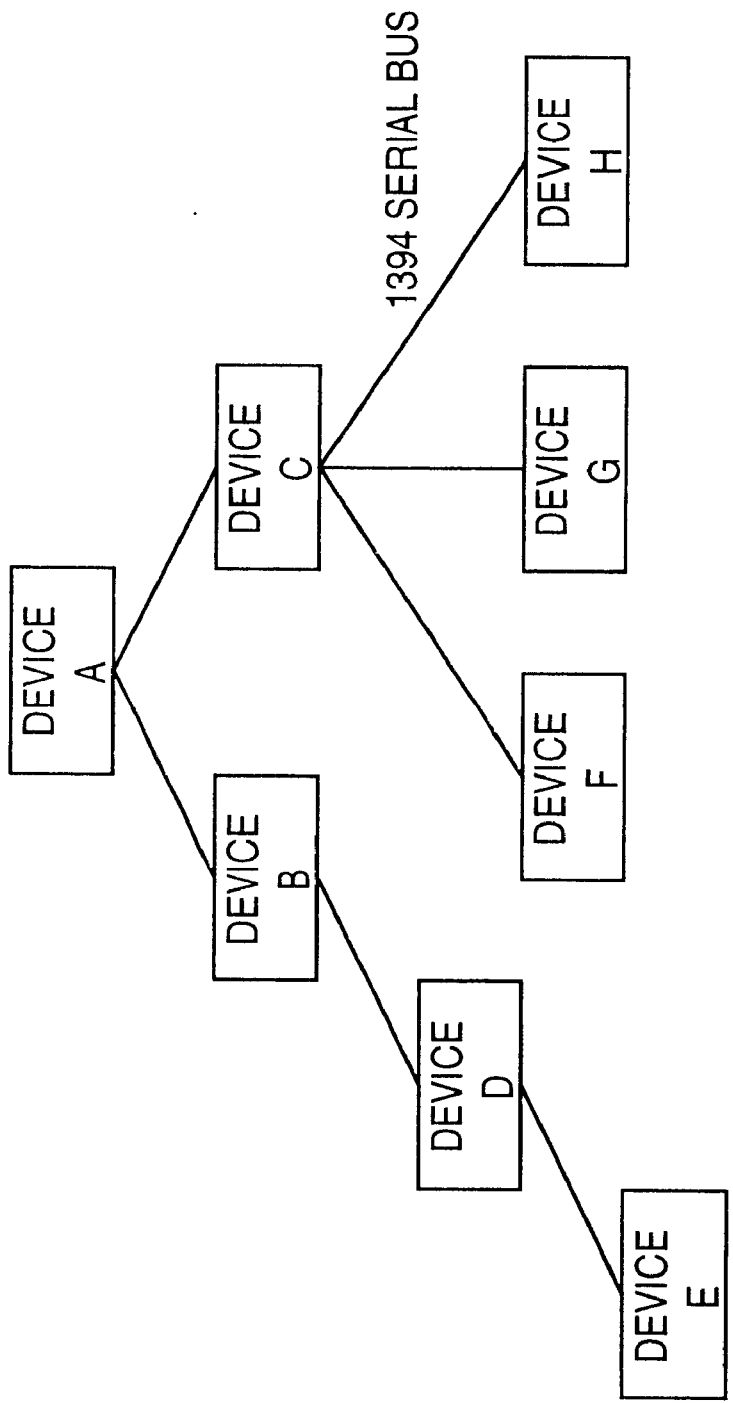
FIG. 6 is a block diagram showing an example of a network system constructed with an 1394 serial bus.

FIG. 6 shows an example of a network system constructed with a 1394 serial bus. This system comprises devices A to H, and the devices A and B, the devices A and C, the devices B and D, the devices D and E, the devices C and F, the devices C and G, and the device C and H are respectively connected by a twisted pair cable for the 1394 serial bus. These devices A to H may be computers such as a personal computer, or most computer-peripheral devices such as a digital VTR, a DVD player, a digital still camera, a storage device using a storage medium such as a hard disk or an optical disk, a monitor such as a CRT or an LCD, a tuner, an image scanner, a film scanner, a printer, a MODEM, and a terminal adapter (TA) and so forth. Note that the printer may employ any printing methods, e.g., an electrophotographic printing method using a laser beam or an LED, an ink-jet printing method, a sublimation type or ink melting type thermal-transfer printing method, a thermal printing method or the like.

The connection between the devices may be made by intermixing a daisy chain method and a node branching method, thus realizing high-freedom of connecting. The respective devices have an ID, and they construct a network by identifying each ID within a range connected by the 1394 serial bus. For example, the devices, respectively, take a relaying role when connected in a daisy-chain with cables for the 1394 serial bus, thus constructing a network.

As the 1394 serial bus corresponds to Plug and Play function, it automatically recognizes a device connected to the cable for the 1394 serial bus, thus recognizes connection status. In the system as shown in FIG. 6, when a device is removed from the network, or a new device is added to the network, the bus is automatically reset (i.e., the current network constructing information is reset), and a new network is constructed. This function enables realtime setting and recognition of network construction.

The 1394 serial bus has a data transfer speed defined as 100/200/400 Mbps. A device having a high transfer speed supports a lower transfer speed, thus maintaining compatibility. As data transfer modes, an asynchronous transfer mode (ATM) for transferring asynchronous data such as control signals, an isochronous transfer mode for transferring isochronous data such as realtime AV data are available. In data transfer, within each cycle (generally 125 ms/cycle), a cycle start packet (CSP) indicating the start of cycle is transferred, and then asynchronous and isochronous data are mixedly transferred such that the isochronous data transfer is transferred prior to the asynchronous data.

Figure 7:
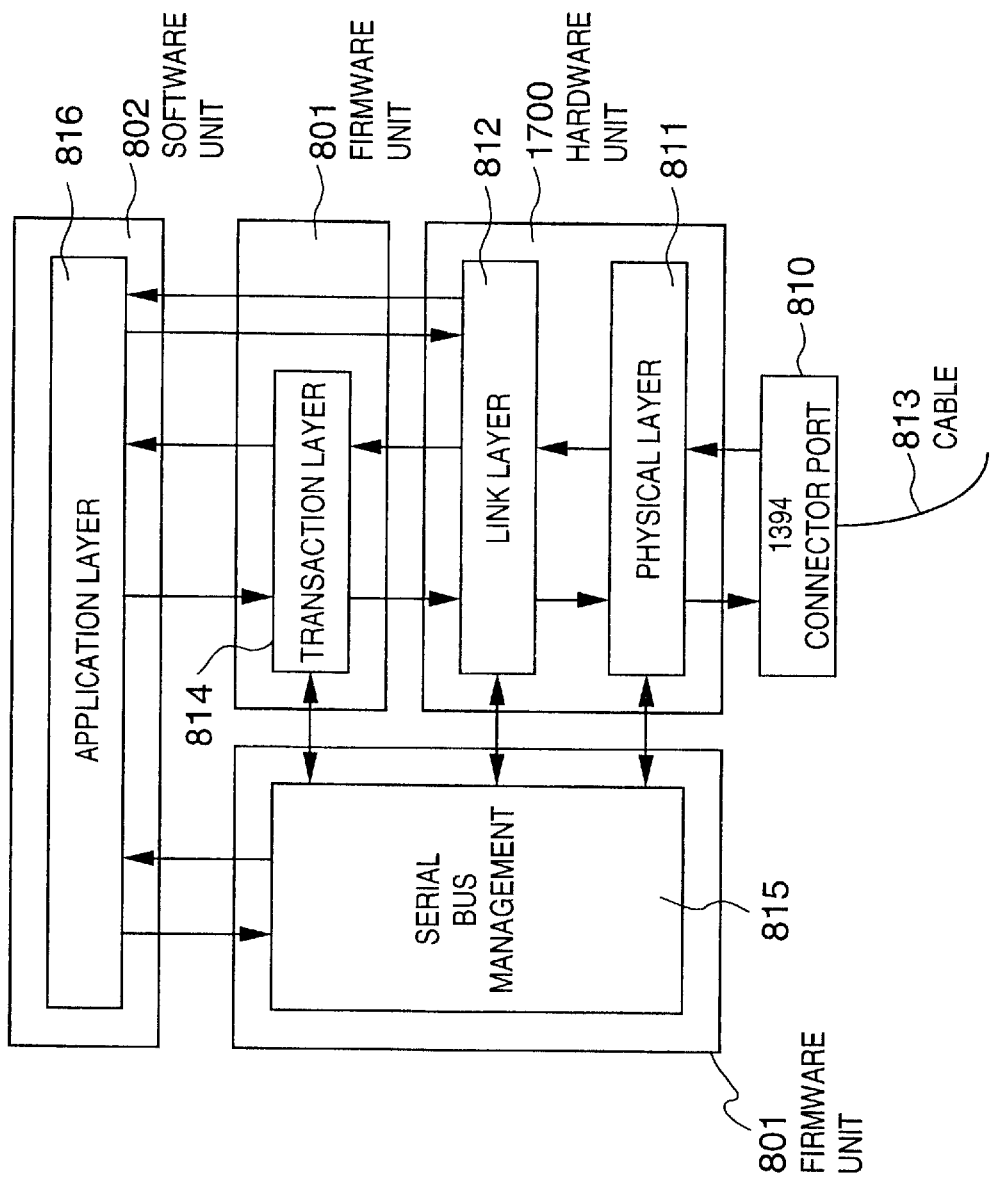
FIG. 7 is a block diagram showing the construction of the 1394 serial bus.

FIG. 7 shows the construction of the 1394 serial bus. The 1394 serial bus has a layer structure. As shown in FIG. 7, a connector port 1710 is connected to a connector at the end of a cable 1713 for the 1394 serial bus. A physical layer 1711 and a link layer 1712 in a hardware unit 1700 are positioned as upper layers with respect to the connector port 1710. The hardware unit 1700 comprises interface chips. The physical layer 1711 performs coding, connection-related control and the like, and the link layer 1712, packet transfer, cycle-time control and the like.

In a firmware unit 1701, a transaction layer 1714 manages data to be transferred (transaction data), and outputs commands Read, Write and Lock. A management layer 1715 in the firmware unit 1701 manages connection statuses and IDs of the respective devices connected to the 1394 serial bus, thus manages the network construction. The above hardware and firmware units substantially construct the 1394 serial bus.

In a software unit 1702, an application layer 1716 differs according to software used by the system, and the data transfer protocol indicating how to transfer data on the interface is defined by a protocol such as a printer protocol or an AVC protocol.

Figure 8:
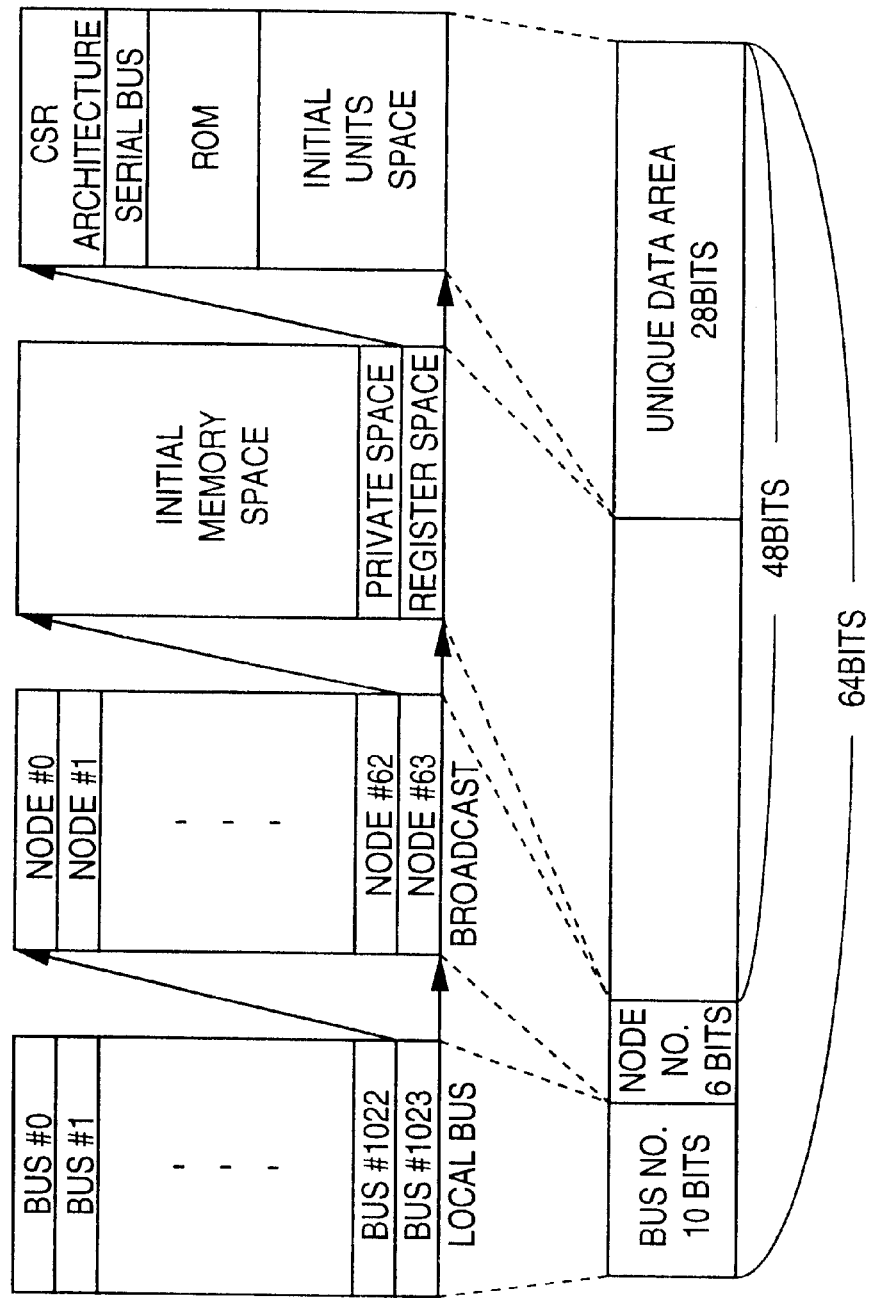
FIG. 8 is an explanatory view showing an address map of the 1394 serial bus.

FIG. 8 shows an example of address space of the 1394 serial bus. All the devices (nodes) connected to the 1394 serial bus have a unique 64 bit address. The 64 bit address is stored in a memory of the devices. Data communication with a designated destination device can be performed by always recognizing the node addresses of the transmitting- and receiving-side nodes.

Addressing of the 1394 serial bus is made based on the IEEE 1212 standards, such that first 10 bits are allocated for designating a bus number, then next 6 bits are allocated for designating a node ID. The remaining 48 bits are the address width allocated to the device, and can be used as unique address space. For instance, the last 28 bits may be used as a unique data area for storing a device identification data or usage condition designation data.

The 1394 serial bus has the construction as described above. Next, the features of the 1394 serial bus which is largely related to the present invention will be described in more detail.

Details of 1394 Serial Bus

[Bus-Reset Sequence]

The respective devices (nodes) connected to the 1394 serial bus are provided with a node ID, and are recognized as nodes constructing the network. For example, when increase/decrease of the number of nodes due to connection/disconnection or power ON/OFF status of network devices, i.e., network construction changes and it is necessary to recognize a new network construction, the respective nodes detect the change of network construction, send a bus-reset signal onto the bus, and enter a mode for recognizing the new network construction. The detection of change of network construction is made by detecting change of bias voltage at the connector port 1710.

When the bus-reset signal is sent from one node, the physical layer 1711 of the respective nodes receives the bus-reset signal, and at the same time, notifies the link layer 1712 of the occurrence of bus reset, and forwards the bus-reset signal to the other nodes. When all the nodes have received the bus-reset signal, a bus-reset sequence is started. Note that the bus-reset sequence is started when the cable is attached/detached, or the hardware unit 1700 has detected network abnormality or the like. Further, the bus-reset sequence is also started by a direct instruction to the physical layer 1711 such as host control by a protocol. As the bus-reset sequence is started, data transfer is suspended during the bus reset, and after the bus reset, the data transfer is restarted in the new network construction.

[Node-ID Determination Sequence]

After the bus reset, the respective nodes start to obtain a node ID so as to construct a new network. Detailed steps of the node-ID determination steps will be described with reference to the network example shown in FIG. 9.

Figure 9:
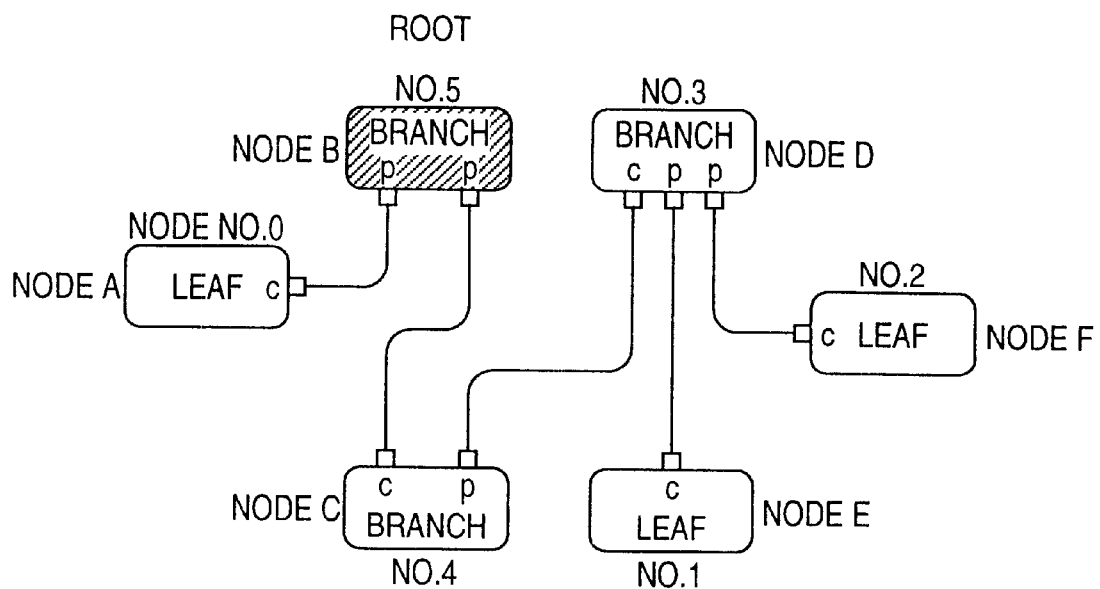
FIG. 9 is an example of a topology map for determining a node ID in the 1394 serial bus.

In the network in FIG. 9, a node B as a root is directly connected to its lower nodes A and C; the node C is directly connected to its lower node D; and the node D is directly connected to its lower nodes E and F. The procedure of determining this hierarchical structure, the root node and the node IDs will be described below.

After the bus reset has occurred, to recognize connection statuses of the respective nodes, parent-child relation is declared between ports of directly connected nodes. "parent" means a node at an upper level and "child" means a node at a lower level in the hierarchical structure. In FIG. 9, the node that first declared parent-child relation after the bus reset is the node A. As described above, nodes (leaves) where only one port is connected can start declaration of parent-child relation. That is, if the number of ports is "1", it is recognized that the node is the end of the network tree, i.e., a leaf. The declaration of parent-child relation is started from the leaf which has first taken action among these leaves. Thus, a port of the leave node is set as a "child", while the port of another node connected to the leave node is set as a "parent". In this manner, "child-parent" relation is sequentially set between the nodes A and B, between the nodes E and D, and between the nodes F and D.

Further, among upper nodes having a plurality of ports, i.e., branches, parent-child relation is sequentially declared with respect to upper node(s), from the node that first received declaration of parent-child relation from the leaf. In FIG. 9, first parent-child relation is determined between the nodes D and E and between the nodes D and F. Then the node D declares parent-child relation with respect to the node C, and as a result, a relation "child-parent" is set between the nodes D and C. The node C, that has received the declaration of parent-child relation from the node D, declares parent-child relation with respect to the node B connected to the other port, thus "child-parent" relation is set between the nodes C and B.

In this manner, the hierarchical structure as shown in FIG. 9 is constructed. The node B, that has finally become the parent at all the ports, is determined as a root. Note that a network has only one root. In a case where the node B that has received declaration of parent-child relation from the node A immediately declares parent-child relation with respect to another node, the other node, e.g., the node C, may be the root node. That is, any node may be a root depending upon timing of transmitting declaration of parent-child relation, and further, even in a network maintaining the same construction, a particular node is not always become a root.

As the root node has been determined, the sequence of determining the respective node IDs is started. Each node has a broadcast function to notify its ID information to all the other nodes. ID information includes a node number, information on a connected position, the number of ports, the number of ports connected to other nodes, information on parent-child relation on the respective ports and the like.

As described above, the assignment of node numbers is started from the leaf nodes. In numerical order, node number=0, 1, 2, . . . is assigned. Then, by the broadcasting of ID information, it is recognized that the node number has been assigned.

As all the leaf nodes have obtained a node number, node numbers are assigned to the branches. Similar to the assignment of node numbers to the leaf nodes, ID information is broadcasted from the branch that received a node number, and finally, the root broadcasts its ID information. Accordingly, the root node always has the largest node number.

Thus, as the ID setting of the overall hierarchical structure has been completed and the network has been constructed, then the bus initialization is completed.

[Arbitration]

Next, the bus arbitration in the physical layer 1711 will be described.

The 1394 serial bus always performs arbitration of a bus-use right prior to data transfer. The devices connected to the 1394 serial bus respectively relay a signal transferred on the network, thus constructing a logical bus-type network transmitting the signal to all the devices within the network. This necessitates bus arbitration to avoid packet conflict. As a result of bus arbitration, one node can transfer data during a certain period.

Figure 10A:
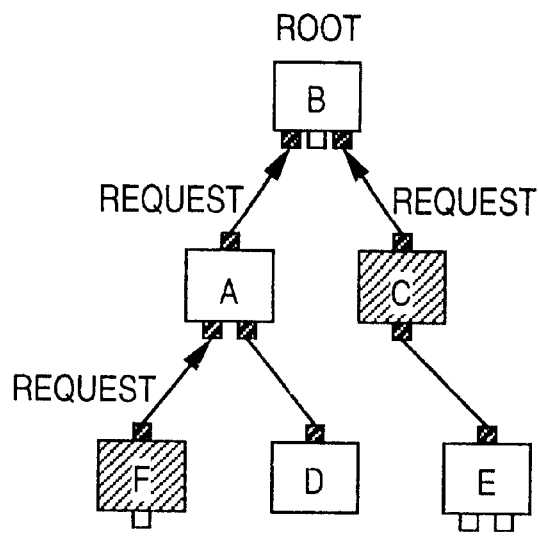
FIGS. 10A and 10B are block diagrams explaining arbitration by the 1394 serial bus.
Figure 10B:
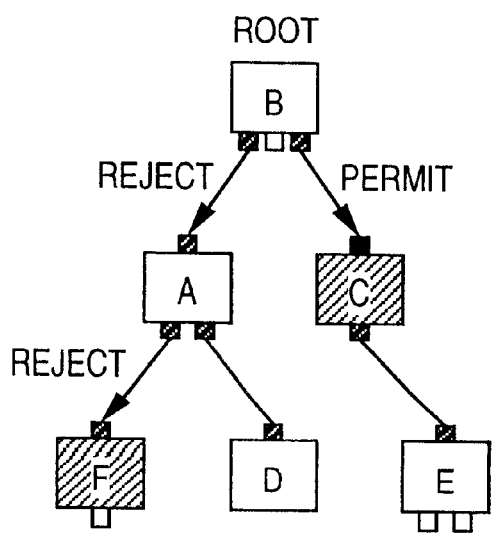

FIGS. 10A and 10B are block diagrams explaining the bus arbitration. FIG. 10A shows operation to request a bus use right; and FIG. 10B, operation to allow to use the bus.

When the bus arbitration is started, a single or plurality of nodes respectively request a bus use right to use the bus to its parent node. In FIG. 10A, the nodes C and F request a bus use right. The parent node (node A in FIG. 10A) that has received the request relays the request by further requesting a bus use right to its parent node. The request is forwarded to a root node that finally performs arbitration.

The root node that has received the request for bus use right determines a node to be provided with the bus use right. This arbitration can be performed only by the root node. The node that dominated in the arbitration is provided with the bus use right. FIG. 10B shows that the node C has obtained the bus use right and the request from the node F has been rejected.

The root sends a DP (data prefix) packet to nodes lost in the bus arbitration so as to notify that their requests have been rejected. The requests from those nodes are held by the next bus arbitration.

Thus, the node that obtained the bus use permission starts data transfer.

Figure 11:
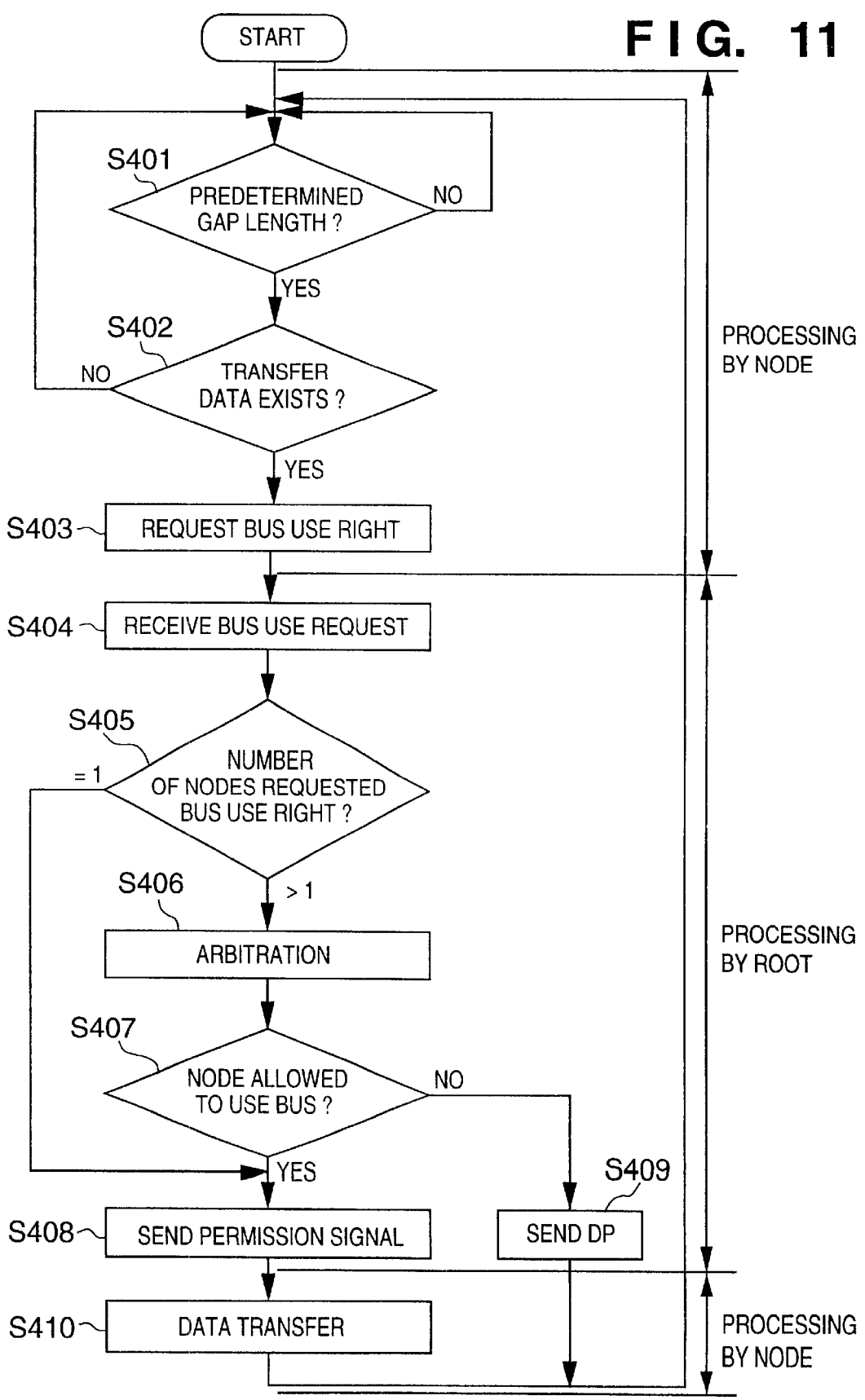
FIG. 11 is a flowchart showing a procedure of the bus arbitration.

The sequence of the bus arbitration will be described with reference to the flowchart of FIG. 11.

To start data transfer by a node, the bus must be in idle status. To confirm that data transfer has been completed and the bus is currently in idle status, each node detects a gap length of a predetermined idle period (e.g., sub-action gap) set in each transfer mode, and it determines whether or not the bus is currently in idle status based on the detection result.

At step S401, the node determines whether or not a predetermined gap length corresponding to asynchronous data or isochronous data to be transferred has been detected. So far as the node has not detected the predetermined gap length, it cannot request a bus use right to start data transfer, accordingly, the node waits until the predetermined gap length has been detected.

When the predetermined gap length has been detected at step S401, the node determines whether or not there is data to be transferred at step S402. If YES, it issues a signal requesting a bus use right to the root at step S403. As shown in FIG. 10, this signal requesting the bus use right is relayed by the respective devices in the network, and forwarded to the root. If it is determined at step S402 that there is no data to be transferred, the process returns to step S401.

At step S404, if the root has received a single or plurality of request signals for the bus use right, it examines the number of nodes requesting the bus use right at step S405. From the determination at step S405, if the number of the nodes requested the bus use right is one, that node is provided with bus use permission immediately after the requirement. On the other hand, if the number of the nodes is more than one, arbitration is performed to determine one node to be provided with the bus use right immediately after the requirement. The arbitration does not always provide a bus use right to the same node, but equally provides a bus use right to the respective nodes (fair arbitration).

The processing at the root node branches at step S407 into processing for the node dominated in the arbitration at step S406, and processing for the other nodes lost in the arbitration. In a case where there is one node that requested the bus use right, or one node has dominated in the arbitration, the node is provided with an permission signal indicative of bus use permission at step S408. The node starts data (packet) transfer immediately after it receives the permission signal (step S410). On the other hand, the nodes lost in the arbitration receive a DP (data prefix) packet indicative of rejection of the bus use request at step S409. The processing for the node that received the DP packet returns to step S401 to request a bus use right again. Also, the processing for the node that completed data transfer at step S410 returns to step S401.

[Asynchronous Transfer]

Figure 12:
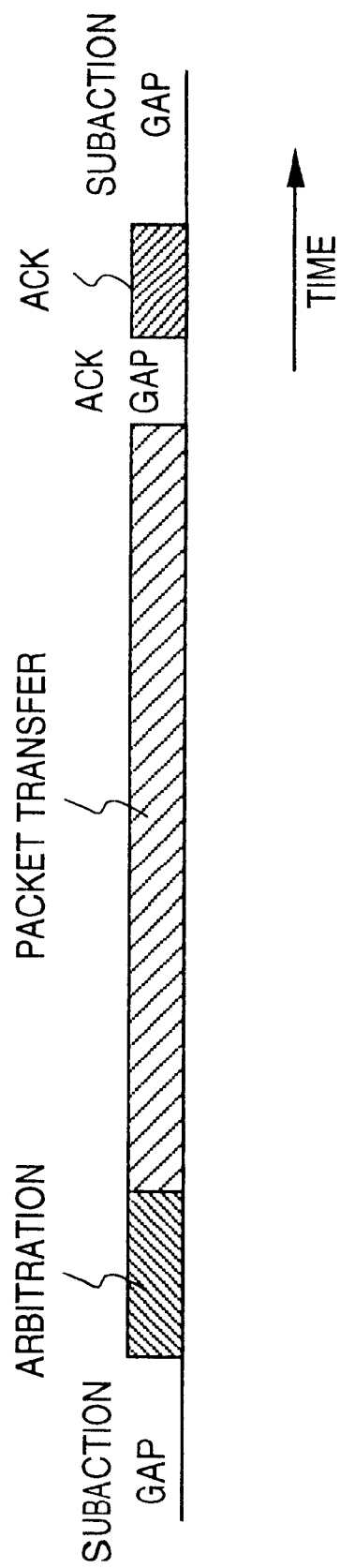
FIG. 12 is a timing chart showing transitional statuses in asynchronous data transfer.

Hereinafter, asynchronous transfer mode (ATM), which is one of the data transfer mode in the 1394 serial bus, is described. FIG. 12 shows transitional statuses in the asynchronous transfer. In FIG. 12, the first sub-action gap represents the idle status of the bus. At a point where the idle time has become a predetermined value, a node which is to perform data transfer requests a bus use right, then bus arbitration is executed.

When the use of bus has been allowed by the arbitration, data in the form of packet is transferred, and a node which receives the data sends a reception acknowledgment code ACK as a response, or sends a response packet after a short gap called ACK gap, thus the data transfer is completed. The code ACK comprises 4-bit information and a 4-bit checksum. The code ACK, including information indicative of success, busy or pending status, is immediately sent to the data-sender node.

Figure 13:
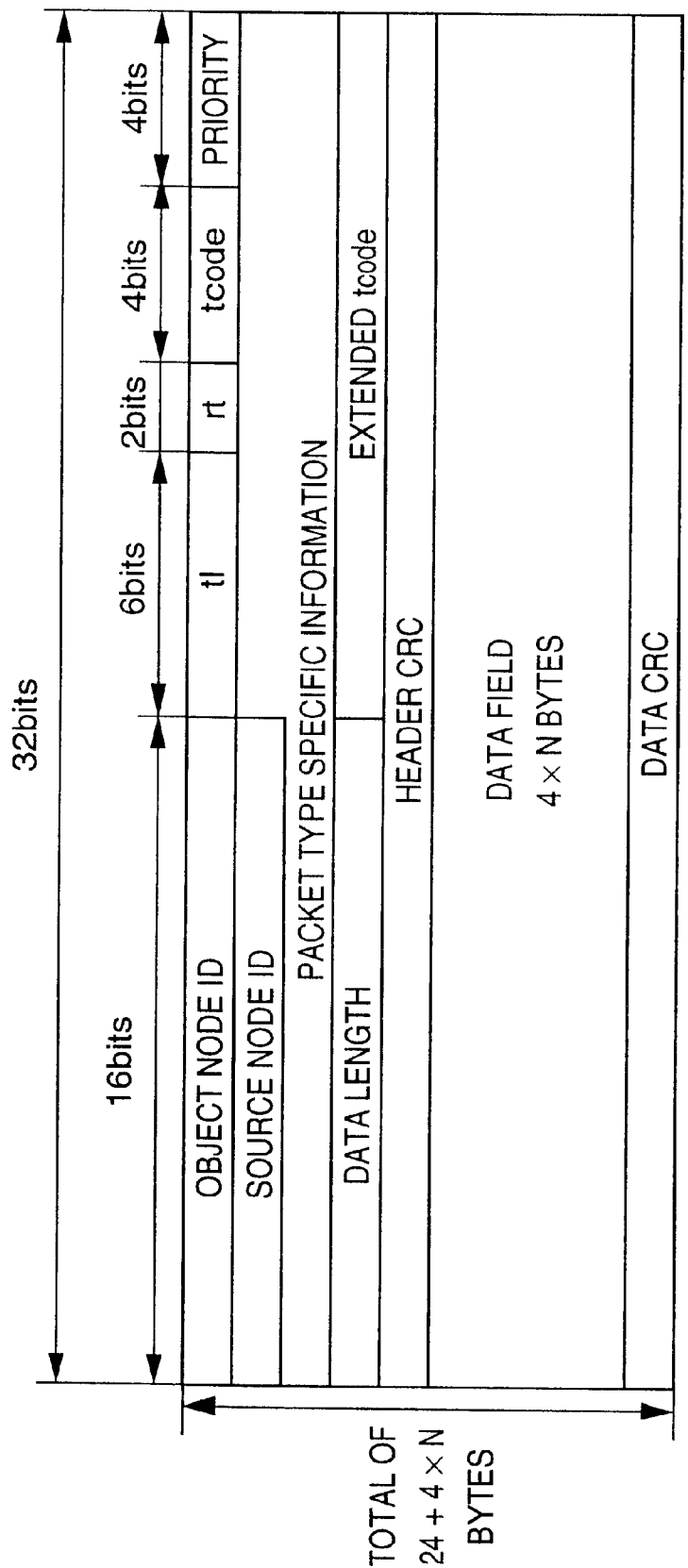
FIG. 13 is a diagram showing a packet format for the asynchronous transfer.

FIG. 13 shows a packet format for asynchronous transfer. The packet has a data area, a data CRC area for error correction, and a header area in which a destination node ID, a source node ID, a transfer data length and various codes are written.

The asynchronous transfer is one-to-one communication from a sender node to a receiver node. A packet sent from the sender node is relayed by the respective nodes in the network, however, as these nodes are not designated as the receiver of the packet, they ignore the packet, then only the receiver node designated by the sender node receives the packet.

[Isochronous Transfer]

Isochronous transfer mode (ITM), which is the other mode of the data transfer mode in the 1394 serial bus, is described. The isochronous transfer mode which is the most significant characteristic of the 1394 serial bus is appropriate to data transfer which particularly requires realtime transfer, such as AV data. Further, the asynchronous transfer is one-to-one transfer, whereas the isochronous transfer is broadcasting transfer from one sender node to all the other nodes.

Figure 14:
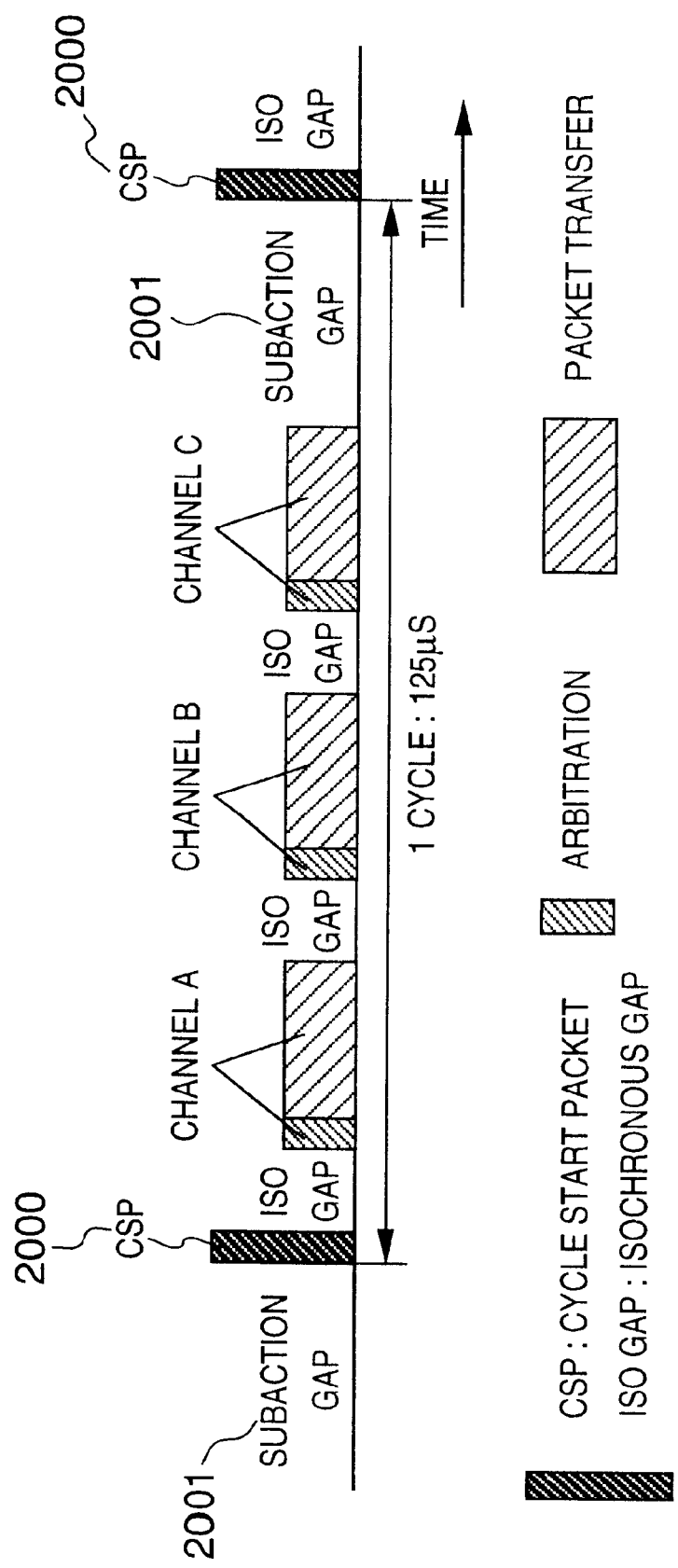
FIG. 14 is a timing chart showing transitional statuses in isochronous data transfer.

FIG. 14 shows transition in the isochronous transfer. The isochronous transfer is executed on the bus in a predetermined cycle, called "isochronous cycle". The period of the isochronous cycle is 125 $\mu$s. A cycle start packet (CSP) 2000 indicates the start of the isochronous cycle for synchronizing the operations of the respective nodes. When data transfer in a cycle has been completed and a predetermined idle period (sub-action gap 2001) has elapsed, a node which is called "cycle master" sends the CSP 2000 indicative of the start of the next cycle. That is, this interval between the issuance of CSP 2000 is 125 $\mu$s.

As channel A, channel B and channel C in FIG. 14, the respective packets are provided with a channel ID, so that plural types of packets can be independently transferred within one isochronous cycle. This enables substantially-realtime transfer among the plural nodes. The receiver node can receive only the data having a desired channel ID. The channel ID does not indicate an address of the receiving node, but merely indicates a logical number with respect to the data. Accordingly, one packet sent from a sender node is transferred to all the other nodes, i.e., broadcasted.

Similar to the asynchronous transfer, bus arbitration is performed prior to the packet broadcasting in isochronous transfer. However, as the isochronous transfer is not one-to-one communication like the asynchronous transfer, the reception acknowledgment code used as a response in the asynchronous transfer is not used in the isochronous transfer.

Further, an isochronous gap (iso gap) in FIG. 14 represents an idle period necessary for confirming prior to isochronous transfer that the bus is in idle status. If a node detects the predetermined idle period, it is determined that the bus is in idle status, and if isochronous transfer is desired, bus arbitration is performed to request the bur use right.

Figure 15:
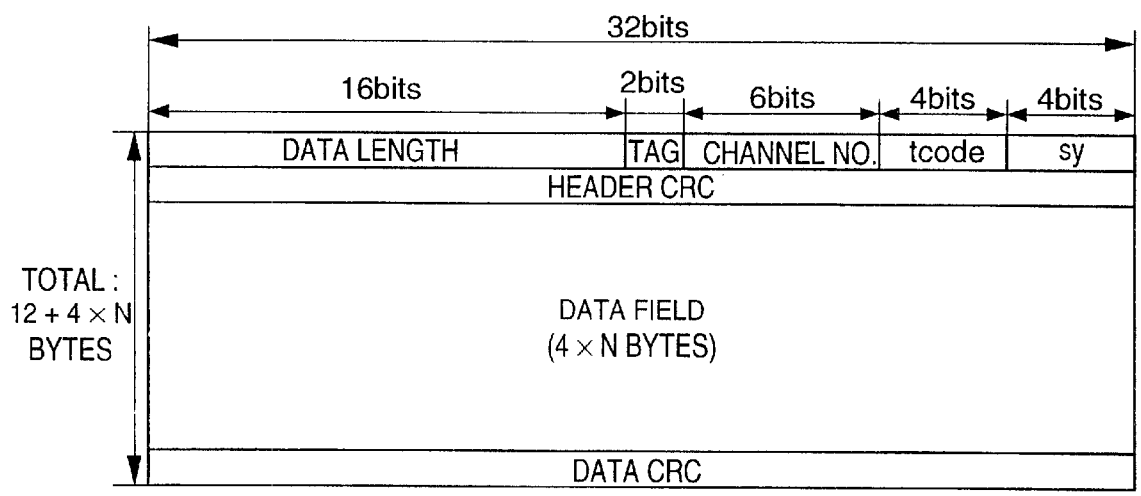
FIG. 15 is a diagram showing a packet format for the isochronous transfer.

FIG. 15 shows a packet format for isochronous transfer. Various packets divided into channels respectively have a data field, a data CRC field for error correction and a header field containing information such as a transfer-data length, a channel number, various codes and error-correction header CRC as shown in FIG. 15.

[Bus Cycle]

Figure 16:
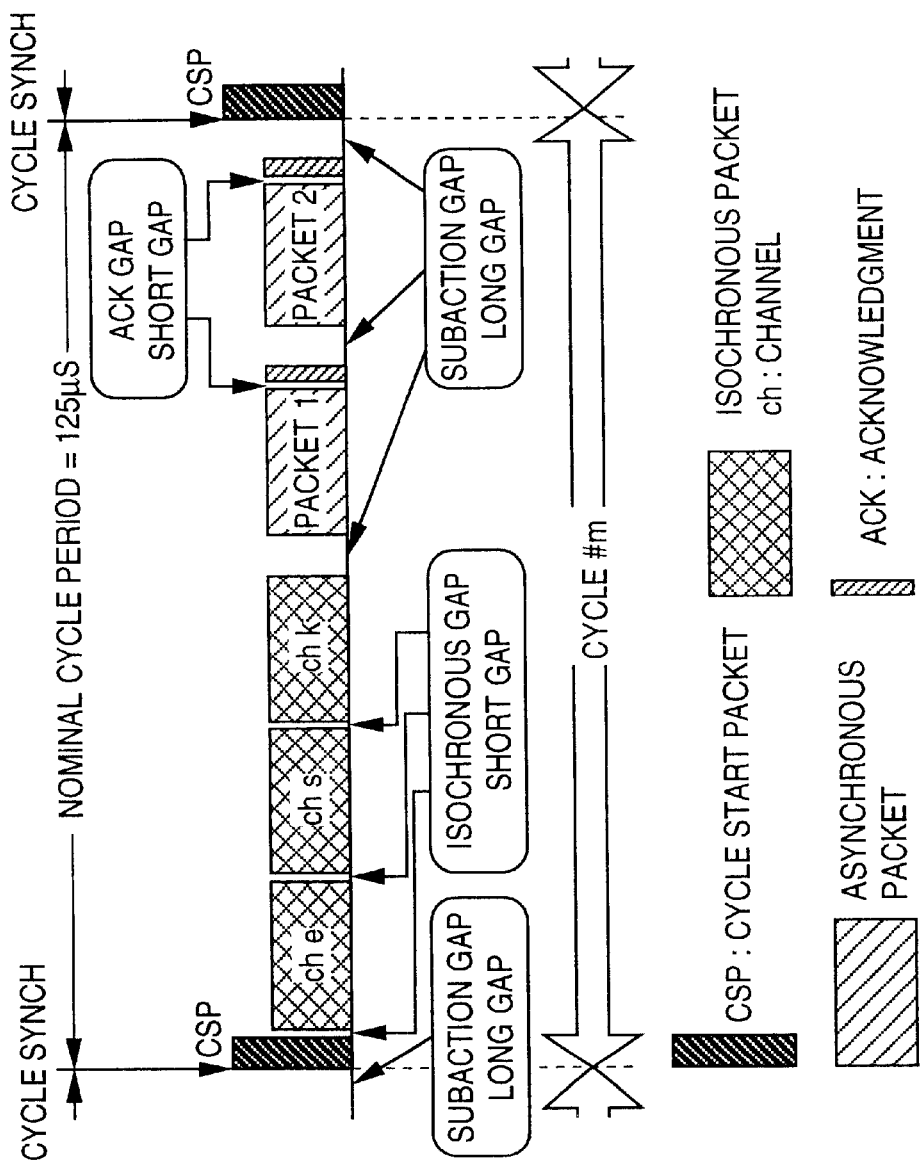
FIG. 16 is a timing chart showing transitional statuses in data transfer on the 1394 serial bus when the isochronous transfer and asynchronous transfer are mixedly performed.

In practice, both isochronous transfer and asynchronous transfer can be mixedly performed on the 1394 serial bus. FIG. 16 shows transition in the isochronous transfer and asynchronous transfer mixedly performed on the 1394 serial bus.

As mentioned above, the isochronous transfer is performed prior to the asynchronous transfer because after the CSP, the isochronous transfer can be started with a gap (isochronous gap) shorter than the gap (sub-action gap) of the idle period necessary for starting the asynchronous transfer. Accordingly, the isochronous transfer has priority over the asynchronous transfer.

In the typical bus cycle as shown in FIG. 16, upon starting the cycle #m, a CSP is transferred from the cycle master to the respective nodes. The operations of the respective nodes are synchronized by this CSP, and node(s) that waits for a predetermined idle period (isochronous gap) to perform isochronous transfer participates in bus arbitration, then starts packet transfer. In FIG. 16, a channel e, a channel s and a channel k are transferred by the isochronous transfer.

The operation from the bus arbitration to the packet transfer is repeated for the given channels, and when the isochronous transfer in the cycle #m has been completed, the asynchronous transfer can be performed. That is, when the idle period has reached the sub-action gap for the asynchronous transfer, node(s) that is to perform the asynchronous transfer participates in bus arbitration. Note that only if the sub-action gap for starting the asynchronous transfer is detected, after the completion of isochronous transfer and before the next timing to transfer the CSP (cycle synch), the asynchronous transfer can be performed.

In the cycle #m in FIG. 16, the isochronous transfer for three channels is performed, and then two packets (packet 1 and packet 2) including ACK are transferred by the asynchronous transfer. When the asynchronous packet 2 has been transferred, as the next cycle synch point to start the subsequent cycle m+1 comes, the transfer in the cycle #m ends. Note that during the asynchronous or isochronous transfer, if the next cycle synch point to transfer the next CSP has come, the transfer is not forcibly stopped but continued. After the transfer has been completed, a CSP for the next cycle is transferred after a predetermined idle period. That is, when one isochronous cycle is continued for more than 125 $\mu$s, the next isochronous cycle is shortened from the reference period 125 $\mu$s. In this manner, the isochronous cycle can be lengthened or shortened based on the reference period 125 $\mu$s.

However, it may be arranged such that the isochronous transfer is performed in every cycle, while the asynchronous transfer is sometimes postponed until the next cycle or the cycle further subsequent to the next cycle, so as to maintain realtime transfer. The cycle master also manages information on such delay.

Print System

Hereinafter, a print system according to the present embodiment is described.

[Outline of System Construction]

Figure 1:
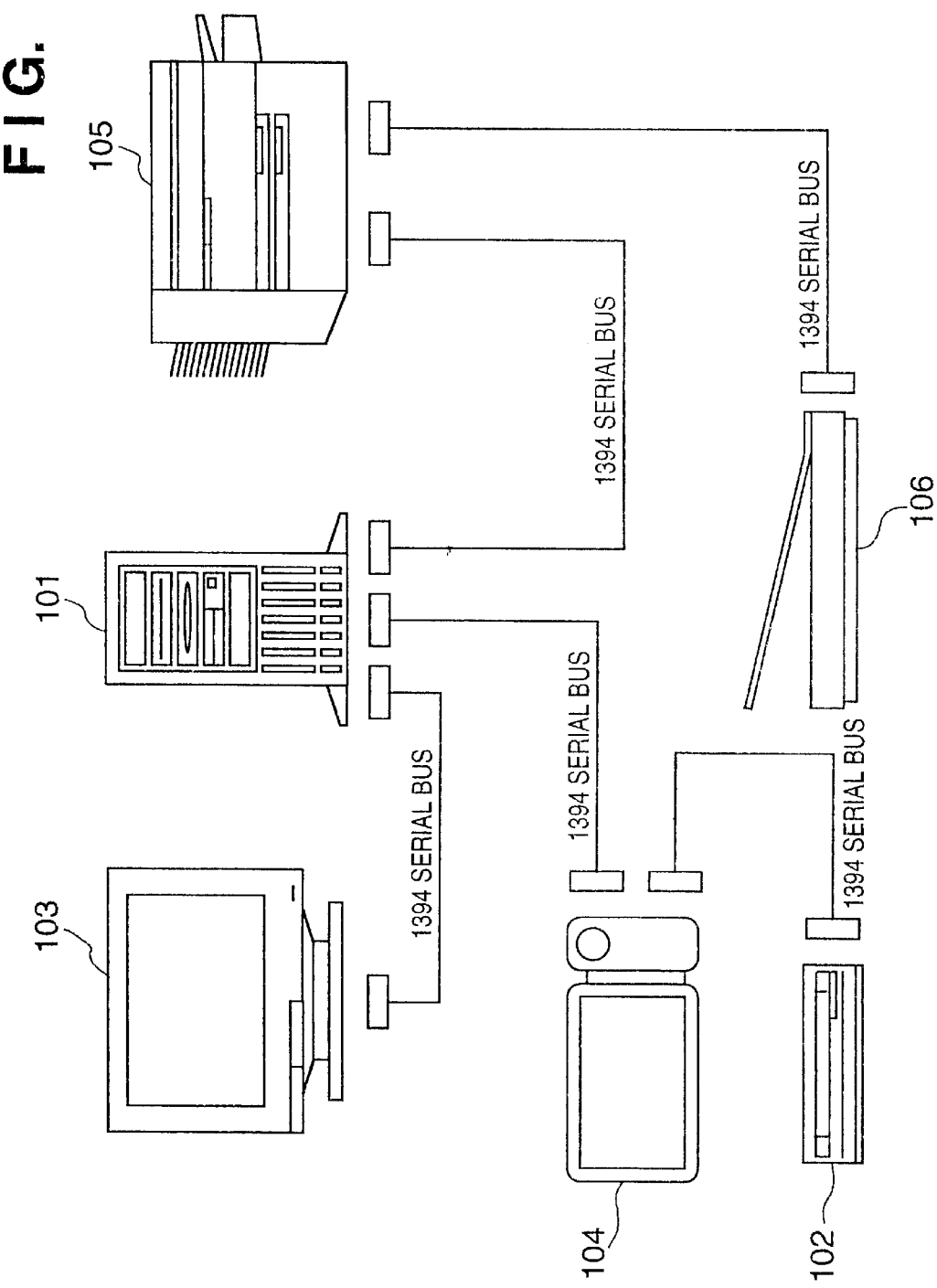
FIG. 1 is a diagram showing a system construction of the network print system according to the first embodiment.

FIG. 1 shows a construction of the print system in which a plurality of devices are connected by 1394 serial bus cables. In FIG. 1, the PC 101, external memory device 102, monitor 103, record-reproduction apparatus 104, printer 105, scanner 106 are connected by the 1394 serial bus indicated by the solid lines in FIG. 1. Each of the devices is capable of data transfer based on the specification of the 1394 serial bus. Herein, the record-reproduction apparatus 104 is a digital camera or a camera-integrated digital VTR which can record and reproduce a moving image or a still image. Furthermore, image data outputted by the record-reproduction apparatus 104 may directly be transferred to the printer 105 for direct printing.

Note that the method of connection by the 1394 serial bus is not limited to the example shown in FIG. 1, but the bus connection may be constructed by arbitrary connection of devices. Besides the devices shown in FIG. 1 as an example, any devices which can construct a network by the 1394 serial bus may be connected, e.g., a data communication apparatus, an external memory device such as hard disk, CDR, DVD or the like.

Figure 2:
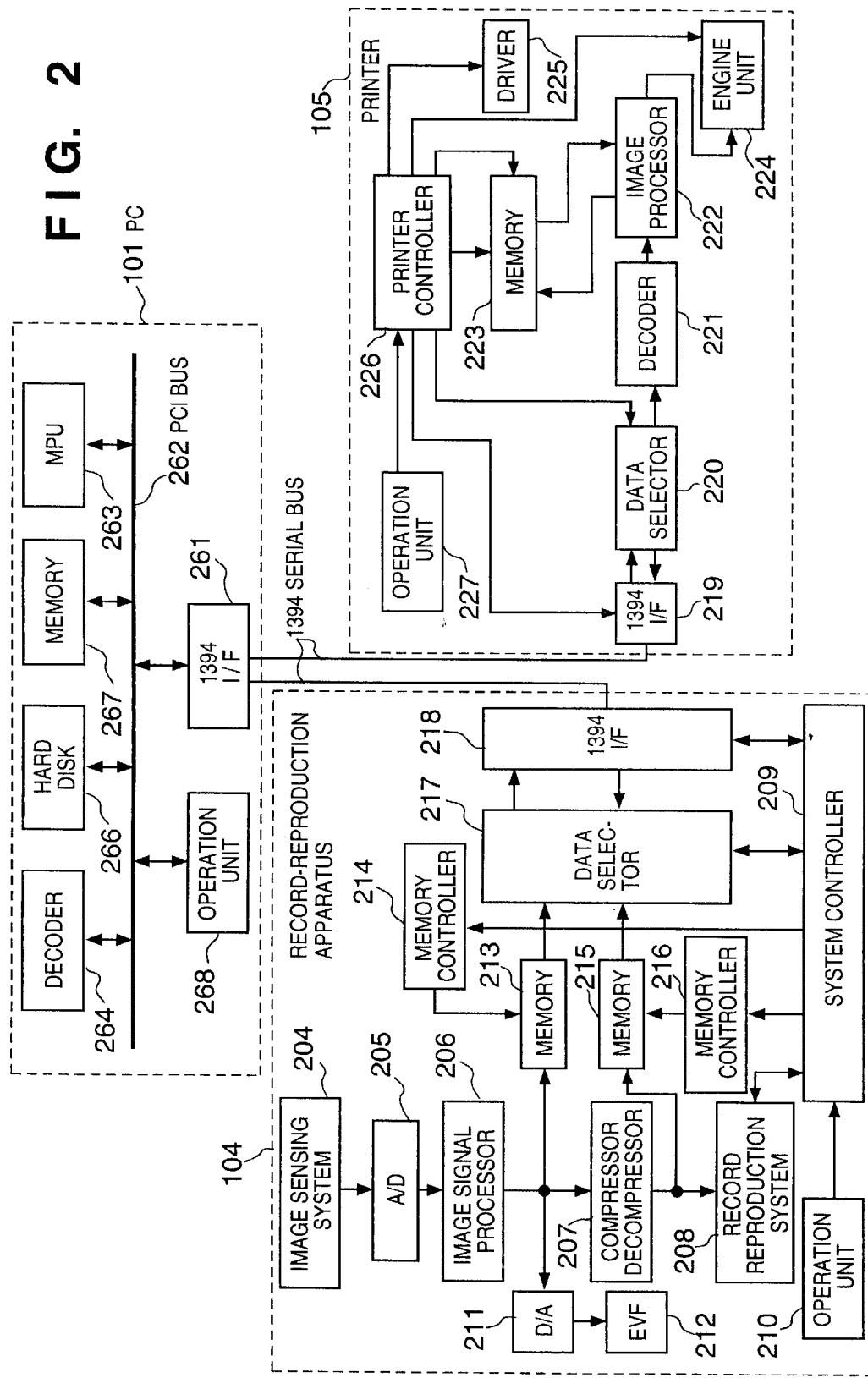
FIG. 2 is a block diagram showing detailed constructions of a PC, a record-reproduction apparatus, and a printer.

Taking the bus construction shown in FIG. 1 as an example, operation of the present embodiment is described with reference to FIG. 2. FIG. 2 is a block diagram showing detailed construction of the PC 101, record-reproduction apparatus 104, and printer 105 which are connected to each other by the 1394 serial bus.

In the record-reproduction apparatus 104, reference numeral 204 denotes an image sensing system; 205, an A/D converter; 206, an image signal processor; 207, a compressor/decompressor which performs compression for recording and decompression for reproducing by a predetermined algorithm; 208, record-reproduction system including a magnetic tape, solid-state memory or the like and the recording-reproducing head; 209, a system controller; 210, an operation unit for command input; 211, a D/A converter; 212, an electric view finder (EVF) serving as a display unit; 213, a frame memory storing image data transferred in a non-compressed form; 214, a memory controller for controlling reading operation of the frame memory 213; 215, a frame memory storing image data transferred in a compressed form; 216, a memory controller for controlling reading operation of the frame memory 215; 217, a data selector; and 218, an interface (I/F) unit of the 1394 serial bus.

In the printer 105, reference numeral 219 denotes an interface (I/F) unit of the 1394 serial bus; 220, a data selector; 221, a decoding circuit for decoding the image data compressed by a predetermined algorithm; 222, an image processor of a printed image; 223, a memory for forming a print image; 224, an engine unit which performs actual printing on a sheet of paper; 225, a driver for performing paper feeding for the engine unit 224; 226, a printer controller controlling the entire printer 105; and 227, an operation unit of the printer.

In the PC 101, reference numeral 261 denotes an interface (I/F) unit of the 1394 serial bus, which is included in the PC 101; 262, a PCI bus; 263, an MPU; 264, decoder for decoding the image data compressed by a predetermined algorithm; 266, a hard disk drive (HDD); 267, a memory; 268, an operation unit such as a keyboard or a mouse or the like.

The PC 101, record-reproduction apparatus 104, and printer 105 shown in FIG. 2 are connected to each other by the 1394 serial bus through the 1394 I/F units 261, 218 and 219 respectively included in the PC 101, record-reproduction apparatus 104 and printer 105.

[Data Transfer Process]

Next, data transfer process is described with reference to the block diagram in FIG. 2.

First, recording operation of the record-reproduction apparatus 104 is described in detail. An image signal sensed by the image sensing system 204 is digitized by the A/D converter 205, and processed by the image signal processor 206. A part of the signal outputted by the image signal processor 206 is converted back to an analogue signal by the D/A converter 211 and displayed on the EVF 212 as a realtime image. The other signal outputted by the image signal processor 206 is compressed by the compressor 207 using a predetermined algorithm, and recorded on a recording medium by the record-reproduction system 208. Used herein as the predetermined compression process is the JPEG method typically used in a digital camera, or a compression method based on discrete cosine transform (DCT) or variable length coding (VLC) as the band compression method for a home-use digital VTR, or the Motion Picture Experts Group (MPEG) method.

When reproducing an image, the record-reproduction system 208 reproduces a desired image from the recording medium. Note that the desired image is selected based on a command inputted by the operation unit 210, and the image is reproduced by the control of the system controller 209. Among the image data read out of the recording medium, data transferred in a compressed form is outputted to the frame memory 215. In order to transfer the image data in a non-compressed form, the data is decompressed by the decompressor 207 and outputted to the frame memory 213. To display the reproduced image on the EVF 212, the image data is decompressed by the decompressor 207, converted back to an analogue signal by the D/A converter 211, and outputted to the EVF 212 to be displayed.

The frame memories 213 and 215 are respectively controlled by the memory controllers 214 and 216 for writing or reading, which are controlled by the system controller 209. The read image data is outputted to the data selector 217. In this stage, the frame memories 213 and 215 are controlled such that the memories 213 and 215 do not output data to the data selector 217 at the same time.

The system controller 209 controls operation of each unit of the record-reproduction apparatus 104. Furthermore, the system controller 209 is also capable of outputting control command data to an external apparatus, e.g., the PC 101 or printer 105, and transmitting the command to the external apparatus on the 1394 serial bus through the data selector 217. Moreover, various data commands, transferred from the PC 101 or printer 105 to the record-reproduction apparatus 104, are inputted to the system controller 209 through the data selector 217, and used for controlling each unit of the record-reproduction apparatus 104.

Command data transferred by the printer 105 or PC 101, which indicates e.g., existence or absence of a decoder or the type of decoder, is inputted to the system controller 209 as a request command. Based on the request command, determination is made as to whether compressed image data or non-compressed image data is to be transferred when the record-reproduction apparatus 104 transfers image data. According to the determination result, the system controller 209 transmits a command to the memory controllers 214 and 216, and performs controlling such that proper data is read out of either one of the frame memories 213 and 215 and transferred.

As described above, whether compressed image data or non-compressed image data is transferred is determined based on the information regarding a decoder included in the printer 105 or the PC 101 where the command has originated. More specifically, if it is determined that the destination apparatus is capable of decoding an image data compression method adopted by the record-reproduction apparatus 104, the system controller outputs image data read out of the frame memory 215 so as to transfer compressed image data. On the contrary, if it is determined that the destination apparatus is not capable of decoding the image data compression method, the system controller outputs image data read out of the frame memory 213 so as to transfer noncompressed image data.

Image data and command data inputted to the data selector 217 is transferred by the 1394 I/F 218 through the cable according to the specification of the 1394 serial bus. For instance, if the data is image data subjected to printing, the printer 105 receives the data, while if the data is image data to be processed by the PC, the PC 101 receives the data. Moreover, command data is also transferred to appropriate nodes. Mainly AV (audio and visual) data is transferred as isochronous data in isochronous transfer method, while command data is transferred as asynchronous data in asynchronous transfer method. However, depending on the transfer state, sometimes it is more convenient to transfer data as asynchronous data, even if the data is normally transferred as isochronous data. In such case, asynchronous data transfer may be performed.

Next, the operation of the printer 105 is described. Data inputted to the 1394 I/F unit 219 is classified according to the data type by the data selector 220. If data to be printed, e.g., image data or the like, is compressed data, the data is decompressed by the decoding circuit 221, and then outputted to the image processor 222. As has been mentioned above, in the present embodiment, since the most appropriate form of data, compressed or non-compressed, is transferred based on the data indicative of the existence or absence of the decoder or the type of decoder, the decoding circuit 221 of the printer 105 can properly decompress the inputted compressed data with a predetermined decompression method. Meanwhile, if the received image data is non-compressed data, in other words, if the printer 105 does not comprise a decoding circuit 221 or the decoding circuit 221 is unable to decompress data compressed by the record-reproduction apparatus 104, the image data is transmitted through the decoding circuit 221 and directly inputted to the image processor 222. Also in a case where non-image data subjected to printing or data not requiring decompression is inputted to the printer 105, the decoding circuit 221 is bypassed.

The data to be printed, which is inputted to the image processor 222 is subjected to image processing for printing, and a print image is formed on the memory 223 on which the printer controller 226 controls storing and reading. The print image is outputted to the engine unit 224 and printed on print paper. Herein, driving the printer unit 105 and other driving operation such as paper feeding or the like are performed by the driver 225. Operation control of the driver 225 and engine unit 224 as well as the control of other units are performed by the printer controller 226. The printer operation unit 227 is provided for paper feeding, reset, toner check, command input such as stand-by/start/stop of the printer operation. In accordance with the command input, the printer controller 226 controls each unit.

If the data inputted to the 1394 I/F unit 219 is command data directed to the printer 105, the command data is transferred from the data selector 220 to the printer controller 226 as a control command. The printer controller 226 controls each unit of the printer 105 in accordance with information indicated by the control command. Moreover, as described above, the printer controller 226 can output information, indicative of the type of decoder included in the decoding circuit 221 of the printer 105 or existence or absence of the decoding circuit 221, and transfer the information as command data to the record-reproduction apparatus 104.

Herein, as an example of decoding function of the decoding circuit 221, the JPEG method can be given. Since the JPEG decoding is realized by software, the decoding circuit 221 can perform decoding by using a JPEG decoding program stored in an internally included ROM, or by using a decoding program transferred from other nodes.

In the present embodiment, since image data compressed according to the JPEG method in the record-reproduction apparatus 104 is transferred to the printer 105 and decoded in the printer 105, more efficient transfer is realized, compared to transferring non-compressed data. Furthermore, since decoding process is performed by software, the printer 105 does not need to include a dedicated decoder. Therefore, it is advantageous in terms of cost. As a matter of course, the decoding circuit 221 may include a JPEG decoding circuit (board) as hardware to perform decoding. In this case, the process speed of decoding can be improved.

In a case where the memory 223 has a capacity for storing image data for one page, print operation is performed after all image data for one page is received. In this case, either isochronous or asynchronous transfer method can be employed. On the contrary, in a case where the memory 223 does not have a capacity for storing image data for one page, data transfer is performed by isochronous transfer method which can ensure a predetermined transfer speed. Thus, the printer 105 performs print operation while performing data transfer. Note that the data transfer speed in this stage must coincide with the printing speed.

As described above, by transferring image data from the record-reproduction apparatus 104 to the printer 105 and performing printing, so-called direct printing is realized. In other words, printing is realized without requiring the process of the PC 101.

According to the above-described present embodiment, before transferring image data from the record-reproduction apparatus to the printer 105 or the PC 101, decoder information is transferred as command data, from the printer 105 which is the destination of the image data transfer, to the record-reproduction apparatus 104 as a transfer originating device. By virtue of this, the record-reproduction apparatus 104 can transfer compressed image data if the destination apparatus is capable of decoding, and transfer non-compressed image data if the destination apparatus is not capable of decoding.

[Printer Construction]

Hereinafter, the construction of the engine unit 224 of the printer 105 is described with reference to FIG. 3.

Figure 3:
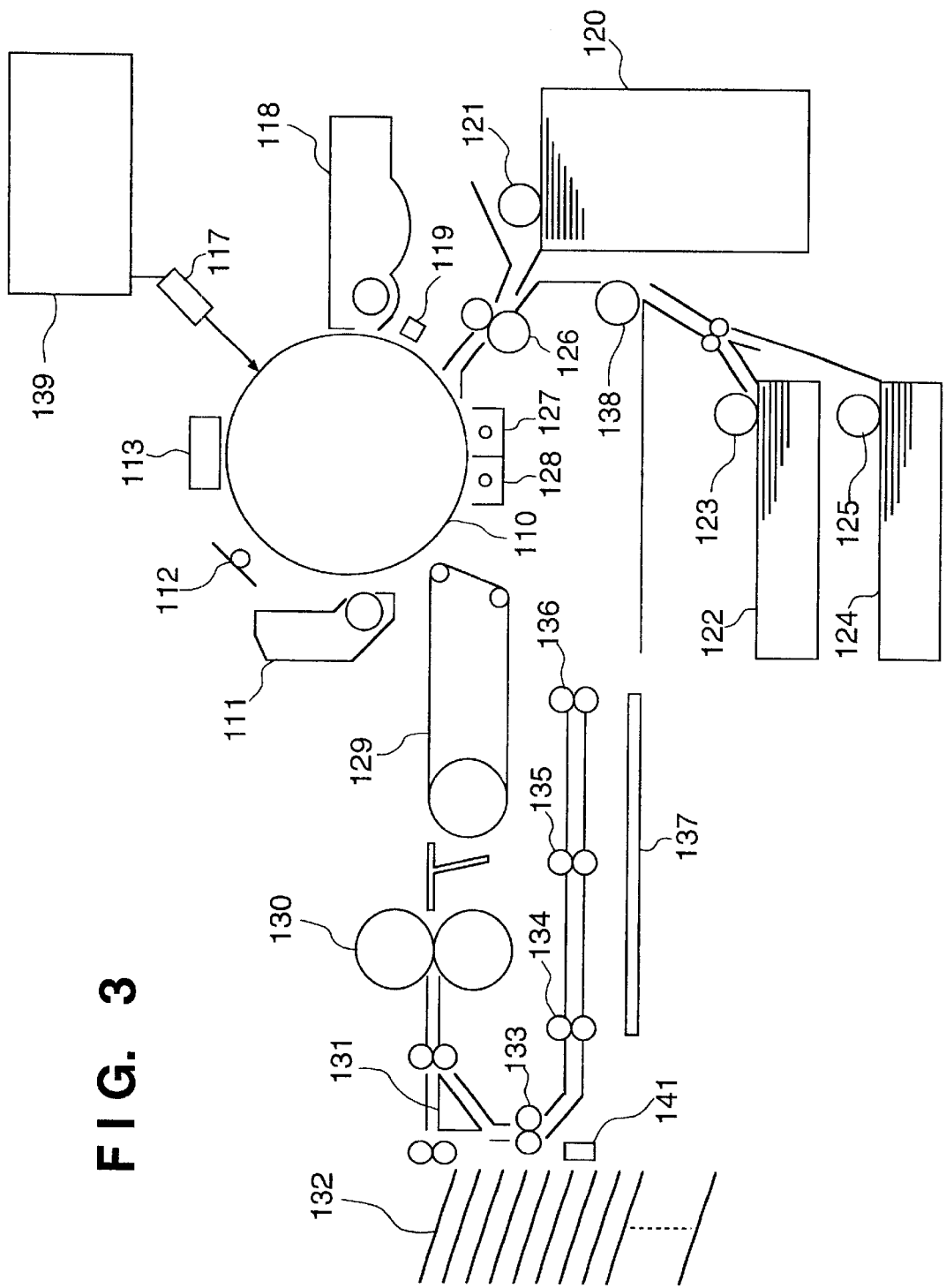
FIG. 3 is a sectional side view showing a construction of the printer according to the present embodiment.

Referring to FIG. 3, reference numeral 110 denotes a photosensitive drum whose charge is removed by a front exposure lamp 112 before image forming. Reference numeral 113 denotes a first electrostatic charger which uniformly and electrostatically charges the photosensitive drum 110. Reference numeral 117 denotes exposure means comprising, e.g., semiconductor laser or the like, which exposes the photosensitive drum 110 based on image data processed by a controller 139 which performs image processing or control of the entire apparatus, and an electrostatic latent image is formed. Reference numeral 118 denotes a developer which contains black developing material (toner). Reference numeral 119 denotes a pre-transfer electrostatic charger which applies high voltage before transferring a toner image, which has been developed on the photosensitive drum 110, on a sheet of paper. Reference numerals 120, 122 and 124 denote paper supply units respectively. By driving each of the paper supply rollers 121, 123 and 125, paper on which an image is to be transferred is fed into the apparatus, comes to a halt at the position where a resist roller 126 is arranged, and conveyed at an appropriate timing for transferring an image formed on the photosensitive drum 110. Reference numeral 127 denotes a transfer charger which transfers a toner image developed on the photosensitive drum 110 on transfer paper. Reference numeral 128 denotes a separation charger for separating the transfer paper, on which the toner image has been transferred, from the photosensitive drum 110. The remaining toner on the photosensitive drum 110 which has not been transferred to the paper is removed by a cleaner 111.

Reference numeral 129 denotes a conveyance belt for conveying the transfer paper, which has completed the transfer process, to a fixer 130 where the toner image is fixed by, e.g., heat. Reference numeral 131 denotes a flapper which controls the conveyance path of the transfer paper, which has completed the fixing process, to either the direction of a staple sorter 132 or the direction of an intermediate tray 137. Paper discharged to the staple sorter 132 is sorted to each bin, and a stapler 141 performs stapling according to a command from the controller 139. Reference numerals 133 to 136 denote conveyance rollers for conveying the transfer paper, which has completed the fixing process once, to the intermediate tray 137 by reversal operation (multiple printing) or irreversal operation (printing on both surfaces). Reference numeral 138 denotes a reconveyance roller for conveying the transfer paper again, stacked on the intermediate tray 137, to the position where the resist roller 126 is arranged.

The controller 139, comprising the printer controller 226, image processor 222 and so forth shown in FIG. 2, performs image forming operation in accordance with a command transferred from the 1394 I/F unit 219 or a command from the operation unit 227.

[Print Operation]

Next, staple-printing operation according to the present embodiment is described in detail with reference to the flowchart in FIG. 4. The printing process of the present embodiment is characterized by avoiding staple operation when outputted results include an erroneous printout caused by bus reset.

Figure 4:
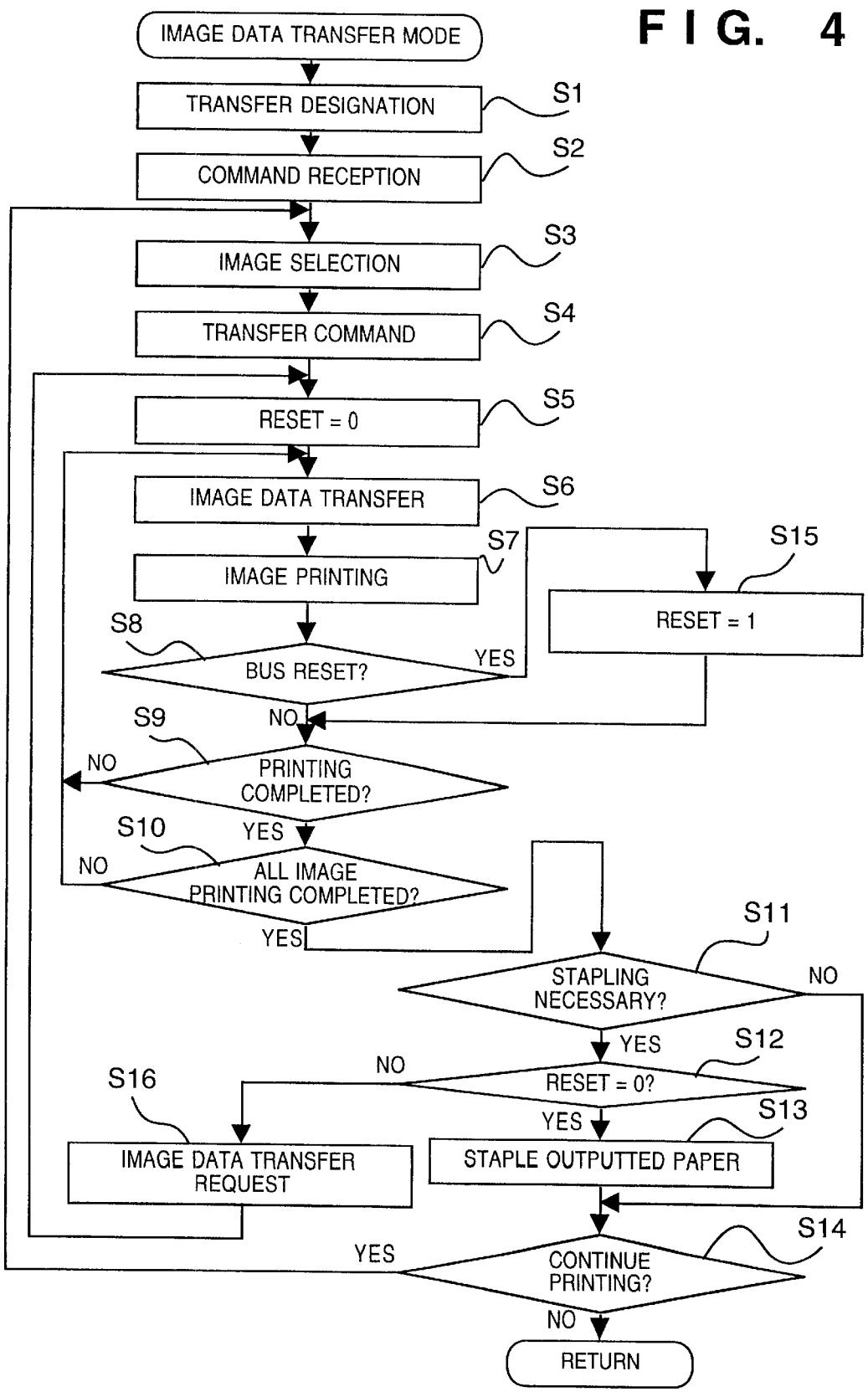
FIG. 4 is a flowchart showing staple-printing operation according to the present embodiment.

FIG. 4 is a flowchart showing a process of transferring picture data (hereinafter referred to as image data) from the record-reproduction apparatus 104 to another device connected by the 1394 serial bus.

In step S1, transfer setting is performed based on a destination device designated by a user. Herein, assume that the printer 105 is designated as a destination device.

In step S2, the record-reproduction apparatus 104 sends a command, including predetermined data indicative of the start of transfer operation, to the printer 105 through the 1394 serial bus. Note that the command also includes data requesting the printer 105 to transfer information regarding existence or absence of a decoder or the type of decoder in the destination device (printer 105).

Then, the printer 105 receives the command and transfers predetermined command data including decoder information to the record-reproduction apparatus 104. Herein, among the command data transferred from the printer 105 as the transfer destination device to the record-reproduction apparatus 104 as the transfer originating device, the decoder information is used as a determination factor to decide whether the compressed recorded image data is to be transferred in the compressed form or non-compressed form. Furthermore, the decoder information serves as request data for the transfer destination device (printer 105) to request data transfer in the compressed data form or non-compressed data form.

As described above, an appropriate output form of image data transfer is set in accordance with the transfer destination device in step S2. In step S3, when a user selects, from images recorded in a recording medium (not shown), image data to be transferred for printing or inputting to the PC, the record-reproduction apparatus 104 performs reading operation of the selected image data.

In step S4, the user inputs a transfer command. At this stage, the sorter and staple functions of the printer 105 are set along with the type of the image, paper size, the number of pages and so forth.

In step 5, a variable RESET is set to 0 in order to monitor bus reset in the 1394 serial bus during image data transfer. In step S6, image data is transferred from the record-reproduction apparatus 104 to the printer 105. If the compression method adopted by the compressor/decompressor 207 in the record-reproduction apparatus 104 is the same as that of the decoding circuit 221 in the printer 105, compressed image data is transferred. If the compression methods are not the same, non-compressed image data is transferred.

In step S7, the image processor 222 performs processing, which conforms to the feature of the printer 105, e.g., image-size changing, filtering, binarization and so forth, on the image data decoded by the printer 105, and printing is performed by the engine unit 224 on a sheet of paper.

Herein, image data transfer is performed in isochronous data transfer which ensures a predetermined transfer speed. The printer 105 performs print operation in realtime along with the image data transfer. In step S8, bus reset is monitored. When bus reset occurs during the image data transfer, the variable RESET is set to 1 in step S15. Note that the bus reset detection in step S8 is realized by the link layer in the 1394 I/F unit 218 of the printer 105 as described above.

Steps S6 to S8 are repeated until completion of image data transfer and printing is determined in step S9. When the transfer and printing operation for one page is completed, the control proceeds to step S10 where determination is made as to whether or not all images selected in step S3 are printed. If printing has not been completed, the control returns to step S6 for image data transfer and printing.

When it is determined in step S10 that transfer and printing for all image data is completed, determination is made in step S11 whether or not stapling is to be performed. Note that setting to perform or not perform stapling can be arbitrarily set by a user by operating, e.g., the operation unit 227. In a case where the stapling is to be performed, the control proceeds to step S12 where determination is made based on the variable RESET whether or not a bus reset has occurred during image data transfer. More specifically, if the variable RESET is 0 in step S12, the control proceeds to step S13 for performing stapling by the stapler 141. Then, the control proceeds to step S14.

Meanwhile, if the variable RESET is 1 in step S12, it indicates that bus reset has occurred during image data transfer. Thus, the image may not have been outputted properly. Therefore, in step S16, re-transfer of the image data requiring stapling operation is requested, and the control returns to step S5 where the variable RESET is cleared.

Note that this re-transfer request is sent by asynchronous transfer. Since the image data transfer and printing is resumed in accordance with the re-transfer request, the stapler 141 is able to staple proper printouts outputted by the printer 105.

Herein, while the paper not stapled due to the occurrence of bus reset is discharged to a predetermined bin, the stapler 141 performs stapling only on the printouts printed based on the re-transferred image data. Therefore, the stapled printouts do not include an erroneous printout.

In a case where stapling is not necessary in step S11, the control proceeds to step S14 where selection is made as to whether or not to continue transfer and printing of other image data. If transfer and printing of other image data is to be continued, the control returns to step S3 to repeat the image selection process, while if transfer and printing of other image data is not to be continued, the process of this flowchart ends. Note that the process shown in the flowchart in FIG. 4 is repeatedly executed any time by returning to step S1 in accordance with an execution command in the image data transfer mode.

Note that the foregoing present embodiment has described an example in which the variable RESET is set to 1 when bus reset occurs, and an image data re-transfer request is sent by referring to the value of the RESET after transfer operation. However, the timing of re-transfer request is not limited to this example. For instance, at the time of bus reset occurrence, image data reception may be suspended, and an image data re-transfer request may be sent. By virtue of such operation, the wasted paper left in the bin without being stapled can be reduced.

As has been described above, according to the present embodiment, when bus reset occurs during image data transfer using the 1394 serial bus, stapling is performed after image data is re-transferred and printing is performed again. By this operation, the outputted result does not include an erroneous printout caused by bus reset, and appropriate stapling can be performed.

<Second Embodiment>

Hereinafter, a second embodiment of the present invention is described.

Figure 5:
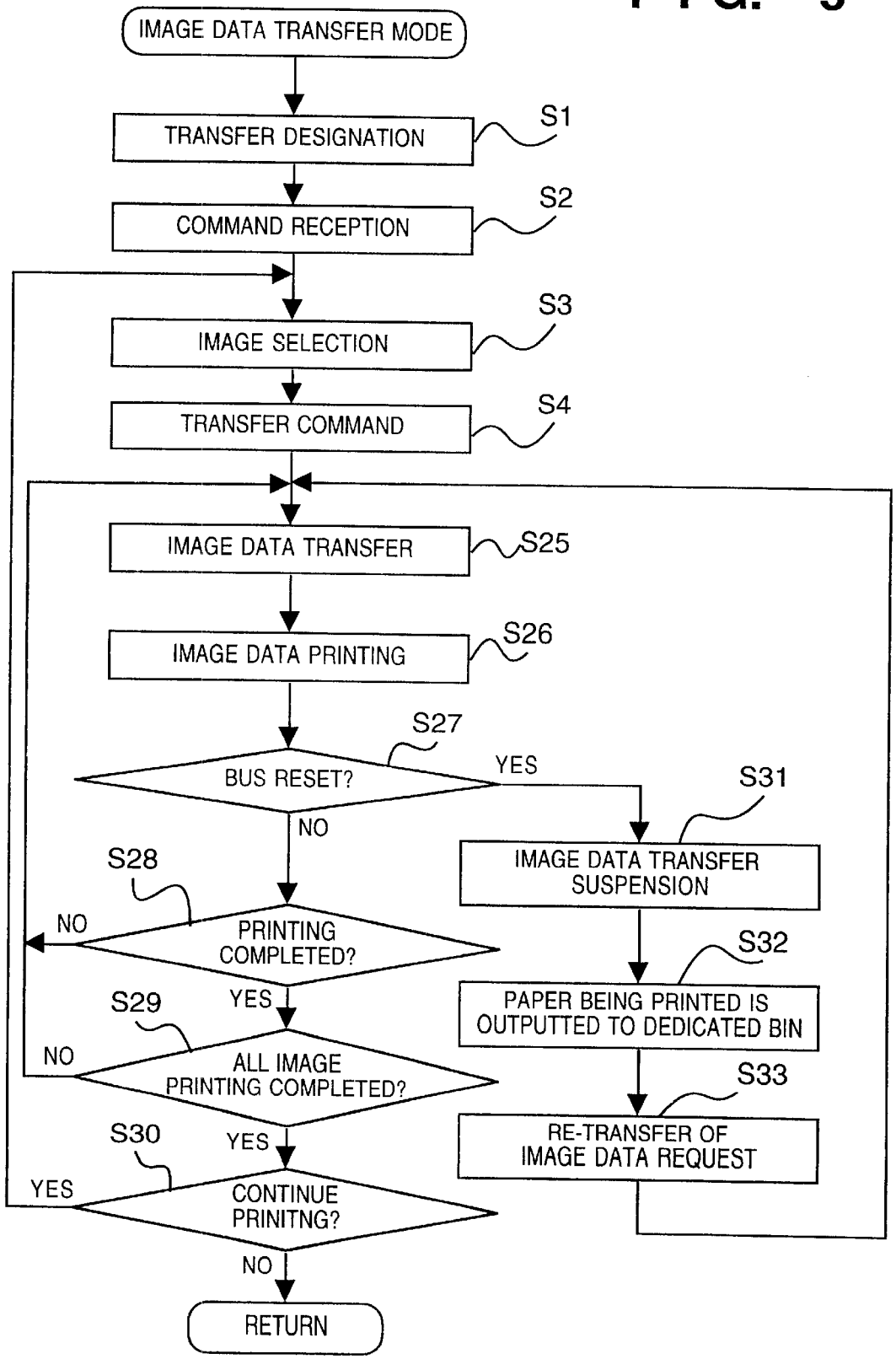
FIG. 5 is a flowchart showing sort-printing operation according to the second embodiment of the present invention.

Since the construction of the print system in the second embodiment is the same as that of the first embodiment shown in FIGS. 1, 2 and 3, detailed description will not be provided herein. Assume also that, in the print system according to the second embodiment, devices are connected to each other by the 1394 serial bus, and data transfer to the printer 105 is performed by isochronous data transfer. FIG. 5 is a flowchart showing sort-printing operation according to the second embodiment. The print process of the second embodiment is characterized by outputting printouts such that proper printouts are not intermingled with an erroneous printout caused by bus reset.

Since steps S1 to S4 in FIG. 5 are identical to steps S1 to S4 in FIG. 4 of the first embodiment, description thereof is omitted.

In step S25, image data is transferred from the record-reproduction apparatus 104 to the printer 105. If the compression method adopted by the compressor/decompressor 207 in the record-reproduction apparatus 104 is the same as that of the decoding circuit 221 in the printer 105, compressed image data is transferred. If the compression methods are not the same, non-compressed image data is transferred.

In step S26, the image processor 222 performs processing conformable to the feature of the printer 105, e.g., image-size changing, filtering, binarization and so on, on the image data decoded by the printer 105, and printing is performed by the engine unit 224 on a sheet of paper. Herein, image data transfer is performed in isochronous data transfer which ensures a predetermined transfer speed. The printer 105 performs print operation in realtime along with the image data transfer.

Since the 1394 serial bus comprises the Plug and Play function, a new device may be connected or disconnected any time. When a device is newly connected or disconnected, bus reset occurs at the 1394 serial bus, and data transfer being executed is suspended and a new network is constructed. However, since printing is performed isochronously with the image data transfer in the second embodiment, if bus reset occurs during image data transfer, the image data transferred at the time of bus reset occurrence cannot be guaranteed, thus may result in an erroneous printout.

In view of this, in the second embodiment, occurrence of bus reset in the 1394 serial bus is monitored in step S27. Note that the bus reset detection in step S27 is realized by the link layer in the 1394 I/F unit 218 of the printer 105 as described in the first embodiment.

If bus reset does not occur during image data transfer, the control proceeds to step S28. Steps S25 to S27 are repeated until completion of image data transfer and printing is determined in step S28. When the transfer and printing operation for one page is completed, the control proceeds to step S29 where determination is made as to whether or not all images selected in step S3 are printed. If printing has not been completed, the control returns to step S25 for image data transfer and printing.

When it is determined in step S29 that transfer and printing operation for all image data is completed, the control proceeds to step S30 where selection is made as to whether or not to continue transfer and printing of other image data. If transfer and printing of other image data is to be continued, the control returns to step S3 to repeat the image selection process, while if transfer and printing of other image data is not to be continued, the process of this flowchart ends. Note that the process shown in the flowchart in FIG. 5 is repeatedly executed any time by returning to step S1 in accordance with an execution command in the image data transfer mode.

Meanwhile in step S27, if bus reset has occurred during image data transfer, the control proceeds to step S31 where the image data transfer being executed is suspended. Then, in step S32, the paper on which printing has been performed is outputted to a specific bin of the staple sorter 132.

A specific bin of the staple sorter 132 may be designated in advance as a dedicated bin for erroneous printout. Alternatively, a user may arbitrarily set a bin of the staple sorter 132 as the dedicated bin for erroneous printout by using the operation unit 227. Alternatively, a bin which is not in use at the time of bus reset occurrence may be used as the dedicated bin for erroneous printout as occasion arises.

Next, in step S33, the image data transfer which has been suspended is requested again to the record-reproduction apparatus 104, and the control returns to step S25. Note that this re-transfer request is sent by asynchronous transfer. In response to the re-transfer request, image data transfer and printing is resumed, and proper printout can be obtained by the printer 105.

Upon completion of transferring and printing all image data in step S29, the stapler 141 performs stapling. Therefore, properly printed paper can be always stapled.

As has been described above, according to the second embodiment, in a case where bus reset occurs during image data transfer using the 1394 serial bus, the transfer and printing operation is suspended, and the paper on which printing has been suspended is outputted to the dedicated bin for erroneous printout, then image data transfer and printing is performed again. By virtue of this, an erroneous printout caused by bus reset is not intermingled with proper printouts. Therefore, users do not need to perform cumbersome operation of removing an erroneous printout.

Note that in the second embodiment, with regard to image data where bus reset has occurred during the image data transfer, other methods may be employed to control output such that an erroneous printout caused by bus reset is not outputted to the same bin as the other proper printouts, without re-transferring the image data or changing the output bin. For instance, the printer may be controlled so as not to discharge the erroneous printout to the bin but to a shredder.

Furthermore, the second embodiment has described an example in which re-transfer of image data is requested when bus reset occurs. However, the timing of re-transfer request is not limited to this example. For instance, a predetermined flag may be raised at the time of bus reset occurrence, and a re-transfer request may be sent by referring to the flag at an arbitrary timing.

Moreover, although one of a plurality of bins of the staple sorter 132 is set as a dedicated bin for discharging an erroneous printout in the above example, two or more bins may be set as the dedicated bin. In other words, any bin setting is possible as long as printed paper which may include errors is distinguished from printed paper on which proper printing has been performed for sure.

In the foregoing first and second embodiments, although an example has been provided for a case where compressed image data recorded in a recording medium is transferred, the present invention is not limited to recorded image data, but may transfer non-recorded compressed image data which is inputted by, for instance, an image sensing apparatus.

Furthermore, the record-reproduction apparatus as the transfer originating device in each of the above-described embodiments is assumed to be a camera-integrated VTR or a digital camera, which mainly processes image data such as moving images or still images. However, other recording and/or reproduction apparatuses such as a digital video disk (DVD) or magnetic disk (MD), or digital devices such as compact disk (CD) or personal computers (PC) may be employed. Alternatively, image input apparatuses such as a scanner or the like may also serve as a transfer originating device.

Moreover, each of the above-described embodiments employs a laser beam printer as the printer 105 which performs image forming process. However, an image output apparatus employing other printing methods, e.g., ink-jet printer or the like, may be utilized.

Furthermore, although the printer 105 described in each of the above-described embodiments comprises the staple sorter 132, a normal sorter may be employed.

Still further, the present embodiment is applicable to not only a printing apparatus, but also a controller alone which realizes operation of a printer.

Moreover, each of the above-described embodiments has provided an example where the network is constructed by using the serial interface defined by the IEEE 1394 standard. However, the present invention is not limited to this, but is applicable to a network constructed by using an arbitrary serial interface, such as a serial interface called Universal Serial Bus (USB).

<Other Embodiments>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus, reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program - codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

In a case where the present invention is applied to the aforesaid storage medium, the storage medium stores program codes corresponding to the flowcharts (FIGS. 4 and 5) described in the foregoing embodiments.

The present invention is not limited to the above embodiments and various changes and modifications can be made within the spirit and scope of the present invention. Therefore, to appraise the public of the scope of the present invention, the following claims are made.

What is claimed is:

1. An image output apparatus connected to another device by a serial bus, comprising:

communication means for performing communication with the another device through the serial bus and receiving image data transferred by the another device;

image formation control means for controlling to form an image on a print medium based on the image data received by said communication means;

staple control means for controlling to staple a plurality of print media on which image forming is performed; and detection means for detecting an initialized state of the serial bus during image data reception by said communication means, wherein in a case where said detection means detects the initialized state of the serial bus, said communication means requests the another device to transfer the image data and receives the image data again, then said image formation control means controls to form an image on a print medium based on the received image data, and said staple control means controls to staple print media on which image forming is performed.

2. The image output apparatus according to claim 1, wherein in a case where said detection means detects the initialized state of the serial bus, said communication means suspends reception of image data.

3. The image output apparatus according to claim 1, wherein said communication means receives image data isochronously transferred.

4. The image output apparatus according to claim 1, wherein said communication means requests image data transfer by asynchronous transfer.

5. The image output apparatus according to claim 1, wherein the initialized state of the serial bus is a state in which a new network is constructed.

6. The image output apparatus according to claim 1, further comprising setting means for setting whether or not staple control is to be performed by said staple control means.

7. The image output apparatus according to claim 1, further comprising image forming means whose image formation is controlled by said image formation control means.

8. The image output apparatus according to claim 1, wherein the serial bus is in conformity with the IEEE 1394 standard.

9. The image output apparatus according to claim 1, wherein the serial bus is in conformity with the USB standard.

10. An image output apparatus connected to another device by a serial bus, comprising:

communication means for performing communication with the another device through the serial bus and receiving image data transferred by the another device;

image formation control means for controlling to form an image on a print medium based on the image data received by said communication means;

discharge control means for controlling to discharge the print medium on which image forming is performed; and detection means for detecting an initialized state of the serial bus during image data reception by said communication means, wherein said discharge control means controls to discharge print medium, on which image forming is performed when said detection means detects the initialized state of the serial bus, so as not to be intermingled with another print medium on which image forming is performed.

11. The image output apparatus according to claim 10, wherein said discharge control means controls to discharge the print medium, on which image forming is performed when said detection means does not detects the initialized state of the serial bus, to a first discharge outlet, and controls to discharge the print medium, on which image forming is performed when said detection means detects the initialized state, to a second discharge outlet different from the first discharge outlet.

12. The image output apparatus according to claim 10, wherein in a case where said detection means detects the initialized state of the serial bus, said communication means suspends reception of image data and requests transferring of the image data.

13. The image output apparatus according to claim 1, wherein said communication means receives image data isochronously transferred.

14. The image output apparatus according to claim 12, wherein said communication means requests image data transfer by asynchronous transfer.

15. The image output apparatus according to claim 10, wherein the initialized state of the serial bus is a state in which a new network is constructed.

16. The image output apparatus according to claim 11, further comprising setting means for setting one of at least two discharge outlets as the second discharge outlet.

17. The image output apparatus according to claim 16, wherein said setting means sets a discharge outlet, which is not used when said detection means detects the initialized state of the serial bus, as the second discharge outlet.

18. The image output apparatus according to claim 10, further comprising image forming means whose image formation is controlled by said image formation control means.

19. The image output apparatus according to claim 10, wherein the serial bus is in conformity with the IEEE 1394 standard.

20. The image output apparatus according to claim 10, wherein the serial bus is in conformity with the USB standard.

21. An image output apparatus comprising:
communication means for performing communication with another device through a serial bus and receiving image data transferred by the another device;
image formation means for forming an image on a print medium based on the image data received by said communication means;
discharge means for discharging the print medium on which image forming is performed;
detection means for detecting an initialized state of the serial bus during image data reception by said communication means; and
control means for controlling said discharge means such that print medium, on which image forming is performed when said detection means detects the initialized state of the serial bus, is discharged so as not to be intermingled with another print medium on which image forming is performed, and controlling said communication means such that reception of image data is suspended and a transfer request of the image data is sent.

22. The image output apparatus according to claim 21, wherein said control means controls said discharge means to discharge the print medium, on which image forming is performed when said detection means does not detects the initialized state of the serial bus, to a first discharge outlet, and discharge the print medium, on which image forming is performed when said detection means detects the initialized state, to a second discharge outlet different from the first discharge outlet.

23. An image output method of an image output apparatus connected to another device by a serial bus, comprising:
a receiving step of performing communication with the another device through the serial bus and receiving image data transferred by the another device;
an image formation control step of controlling to form an image on a print medium based on the image data received in said receiving step;
a staple control step of controlling to staple a plurality of print media on which image forming is performed;
a monitoring step of monitoring occurrence of an initialized state of the serial bus during said receiving step; and
a transfer request step of requesting the another device to transfer the image data when the initialized state of the serial bus is detected,
wherein in a case where the initialized state of the serial bus is detected in said monitoring step, print media, on which image forming is performed based on image data transferred in response to a transfer request in said transfer request step, are controlled to be stapled in said staple control step.

24. The image output method according to claim 23, wherein in a case where the initialized state of the serial bus is detected in said monitoring step, said receiving step is suspended.

25. The image output method according to claim 23, wherein in said receiving step, image data isochronously transferred is received.

26. The image output method according to claim 23, wherein in said transfer request step, image data transfer is requested by asynchronous transfer.

27. The image output method according to claim 23, wherein the initialized state of the serial bus is a state in which a new network is constructed.

28. The image output method according to claim 23, further comprising a setting step of setting whether or not said staple control step is to be executed.

29. An image output method of an image output apparatus connected to another device by a serial bus, comprising:
a receiving step of performing communication with the another device through the serial bus and receiving image data transferred by the another device;
an image forming control step of controlling to form an image on a print medium based on the image data received in said receiving step;
a monitoring step of monitoring occurrence of an initialized state of the serial bus during said receiving step; and
a discharge control step of controlling to discharge the print medium, on which image forming is performed when the initialized state of the serial bus is detected in said monitoring step, so as not to be intermingled with another print medium on which image forming is performed.

30. The image output method according to claim 29, wherein in said discharge control step, the print medium, on which image forming is performed when the initialized state of the serial bus is not detected in said monitoring step, is discharged to a first discharge outlet, and the print medium, on which image forming is performed when the initialized state is detected, is discharged to a second discharge outlet different from the first discharge outlet.

31. The image output method according to claim 29, further comprising a transfer request step of requesting the another device to transfer the image data again after suspending said receiving step in a case where the initialized state of the serial bus is detected in said monitoring step.

32. The image output method according to claim 29, wherein image data isochronously transferred is received in said receiving step.

33. The image output method according to claim 31, image data transfer is requested by asynchronous transfer in said transfer request step.

34. The image output method according to claim 29, wherein the initialized state of the serial bus is a state in which a new network is constructed.

35. The image output method according to claim 30, further comprising a setting step of setting one of at least two discharge outlets as the second discharge outlet.

36. The image output method according to claim 35, wherein in said setting step, a discharge outlet, which is not used when the initialized state of the serial bus is detected in said monitoring step, is set as the second discharge outlet.

37. An image output system in which an image input apparatus and an image output apparatus are connected by a serial bus, said image input apparatus comprising:
first communication means for performing communication with said image output apparatus through the serial bus and transferring image data to said image output apparatus, and said image output apparatus comprising:
second communication means for performing communication with said image input apparatus through the serial bus and receiving the image data transferred by said image input apparatus;
image formation control means for controlling to form an image on a print medium based on the image data;
staple control means for controlling to staple a plurality of print media on which image forming is performed; and
detection means for detecting an initialized state of the serial bus during image data reception by said second communication means,
wherein in a case where said detection means detects the initialized state of the serial bus, said second communication means requests said image input apparatus to transfer the image data and receives the image data again, then said image formation control means controls to form an image on a print medium based on the received image data, and said staple control means controls to staple print media on which image forming is performed.

38. The image output system according to claim 37, wherein said first and second communication means transfer and receive the image data by isochronous transfer.

39. The image output system according to claim 37, wherein said second communication means requests image data transfer by asynchronous transfer.

40. The image output system according to claim 37, wherein the initialized state of the serial bus is a state in which a new network is constructed.

41. The image output system according to claim 37, wherein the serial bus is in conformity with the IEEE 1394 standard.

42. The image output system according to claim 37, wherein the serial bus is in conformity with the USB standard.

43. An image output system in which an image input apparatus and an image output apparatus are connected by a serial bus, said image input apparatus comprising:
first communication means for performing communication with said image output apparatus through the serial bus and transferring image data to said image output apparatus, and said image output apparatus comprising:
second communication means for performing communication with said image input apparatus through the serial bus and receiving the image data transferred by said image input apparatus;
image formation control means for controlling to form an image on a print medium based on the image data;
discharge control means for controlling to discharge the print medium on which image forming is performed; and
detection means for detecting an initialized state of the serial bus during image data reception by said second communication means,
wherein said discharge control means controls to discharge the print medium, on which image forming is performed when said detection means detects the initialized state of the serial bus, so as not to be intermingled with another print medium on which image forming is performed, and
said second communication means suspends reception of image data and requests said image input apparatus to transfer the image data.

44. The image output system according to claim 43, wherein said discharge control means controls to discharge the print medium, on which image forming is performed when said detection means does not detects the initialized state of the serial bus, to a first discharge outlet, and discharges the print medium, on which image forming is performed when said detection means detects the initialized state, to a second discharge outlet different from the first discharge outlet.

45. The image output system according to claim 43, wherein said first and second communication means receive image data isochronously transferred.

46. The image output system according to claim 43, wherein said second communication means requests image data transfer by asynchronous transfer.

47. The image output system according to claim 43, wherein the initialized state of the serial bus is a state in which a new network is constructed.

48. The image output system according to claim 43, wherein the serial bus is in conformity with the IEEE 1394 standard.

49. The image output system according to claim 43, wherein the serial bus is in conformity with the USB standard.

50. A recording medium recording program codes of an image output method for an image output apparatus connected to another device by a serial bus, said program codes comprising at least:

codes for a receiving step of performing communication with the another device through the serial bus and receiving image data transferred by the another device;

codes for an image formation control step of controlling to form an image on a print medium based on the image data received in said receiving step;

codes for a staple control step of controlling to staple a plurality of print media on which image forming is performed;

codes for a monitoring step of monitoring occurrence of an initialized state of the serial bus during said receiving step; and codes for a transfer request step of requesting the another device to transfer the image data when the initialized state of the serial bus is detected, wherein in a case where the initialized state of the serial bus is detected in said monitoring step, print media, on which image forming is performed based on image data transferred in response to a transfer request in said transfer request step, are controlled to be stapled in said staple control step.

51. A recording medium recording program codes of an image output method for an image output apparatus connected to another device by a serial bus, said program codes comprising at least:

codes for a receiving step of performing communication with the another device through the serial bus and receiving image data transferred by the another device;

codes for an image forming control step of controlling to form an image on a print medium based on the image data received in said receiving step;

codes for a monitoring step of monitoring occurrence of an initialized state of the serial bus during said receiving step; and codes for a discharge control step of controlling to discharge the print medium, on which image forming is performed when the initialized state of the serial bus is detected in said monitoring step, so as not to be intermingled with another print medium on which image forming is performed.

52. The recording medium according to claim 51, wherein said program codes further comprising codes for a transfer request step of suspending said receiving step in a case where the initialized state of the serial bus is detected in said monitoring step, and requesting the another device to transfer the image data again.

* * * * *

UNITED STATES PATENT AND TRADEMARK OFFICE
CERTIFICATE OF CORRECTION

PATENT NO. : 6,538,758 B1
DATED : March 25, 2003
INVENTOR(S) : Yoshiharu Ikegawa It is certified that error appears in the above-identified patent and that said Letters Patent is hereby corrected as shown below:

Column 6,
Line 24, "is" should read -- does --.

Column 7,
Line 42, "requested" should read -- requesting --.
Line 52, "lost" should read -- that lost --.
Line 55, "an" should read -- a --.
Line 67, "mode" should read -- modes --.

Column 9,
Line 4, "bur" should read -- bus --.

Column 15,
Line 53, "not" should read -- not to --.

Column 20,
Line 51, "detects" should read -- detect --.

Column 21,
Line 45, "detects" should read -- detect --.

Column 24,
Line 11, "detects" should read -- detect --.

Signed and Sealed this

Eleventh Day of November, 2003

JAMES E. ROGAN
*Director of the United States Patent and Trademark Office*